US010633293B2

(12) United States Patent
Kondo et al.

(10) Patent No.: US 10,633,293 B2
(45) Date of Patent: *Apr. 28, 2020

(54) HONEYCOMB STRUCTURE

(71) Applicant: NGK INSULATORS, LTD., Nagoya (JP)

(72) Inventors: Takahiro Kondo, Nagoya (JP); Yasushi Kato, Nagoya (JP); Junki Matsuya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 378 days.

This patent is subject to a terminal disclaimer.

(21) Appl. No.: 15/616,213

(22) Filed: Jun. 7, 2017

(65) Prior Publication Data
US 2017/0355645 A1    Dec. 14, 2017

(30) Foreign Application Priority Data

Jun. 13, 2016 (JP) ................. 2016-117310

(51) Int. Cl.
C04B 38/00 (2006.01)
C04B 35/195 (2006.01)
(Continued)

(52) U.S. Cl.
CPC ...... C04B 38/0009 (2013.01); B01D 46/2455 (2013.01); B01J 35/04 (2013.01);
(Continued)

(58) Field of Classification Search
CPC ............ B01D 46/2429; B01D 46/2455; B01D 46/24; B01D 53/943; B01D 53/9409; B01D 2046/2433; B01D 2046/2437; B01D 2046/2481; B01D 2255/9155; B01J 35/10; B01J 29/7615; F01N 3/0222; C04B 35/195

See application file for complete search history.

(56) References Cited

U.S. PATENT DOCUMENTS 9,346,003 B2    5/2016  Suenobu et al.
2006/0105139 A1*  5/2006  Suwabe ............ B01D 46/0001
                                                     428/116

(Continued)

FOREIGN PATENT DOCUMENTS

JP    2013-063422 A1    4/2013

Primary Examiner — Amber R Orlando
(74) Attorney, Agent, or Firm — Burr & Brown, PLLC

(57) ABSTRACT

The honeycomb structure body has a dense part at a part in axial direction including a center region of the inflow end face, the dense part having a change ratio of porosity calculated by the following Expression (1) that is 2 to 8%, and has an outside-diameter increasing part, and the honeycomb structure body has a change ratio of average diameter calculated by the following Expression (2) that is 0.2 to 3%, $$(1-Px/Py) \times 100, \qquad \text{Expression (1):}$$

in Expression (1), Px denotes the porosity (%) at the center region of the inflow end face, and Py denotes the porosity (%) of a circumferential region of the inflow end face.

$$(1-Dx/Dy) \times 100, \qquad \text{Expression (2):}$$

in Expression (2), Dx denotes the average diameter (mm) of the inflow end face, and Dy denotes the average diameter (mm) of the outflow end face.

8 Claims, 11 Drawing Sheets

(51) Int. Cl.
*B01D 46/24* (2006.01)
*B01D 53/94* (2006.01)
*B01J 35/04* (2006.01)
*B01J 35/10* (2006.01)
*C04B 111/00* (2006.01)

(52) U.S. Cl.
CPC ............. *B01J 35/10* (2013.01); *C04B 35/195* (2013.01); *B01D 46/247* (2013.01); *B01D 46/2429* (2013.01); *B01D 53/9431* (2013.01); *B01D 2046/2433* (2013.01); *B01D 2046/2437* (2013.01); *B01D 2046/2481* (2013.01); *B01D 2046/2496* (2013.01); *C04B 2111/0081* (2013.01); *C04B 2111/00474* (2013.01); *C04B 2111/00793* (2013.01)

(56) References Cited

U.S. PATENT DOCUMENTS

| | | | |
|---|---|---|---|
| 2009/0011176 A1* | 1/2009 | Ichikawa | B01D 46/2422 428/116 |
| 2013/0071608 A1 | 3/2013 | Suenobu et al. | |
| 2014/0116016 A1* | 5/2014 | Mizuno | B01D 46/2425 55/523 |

* cited by examiner

HONEYCOMB STRUCTURE

"The present application is an application based on JP-2016-117310 filed on Jun. 13, 2016 with Japan Patent Office, the entire contents of which are incorporated herein by reference."

BACKGROUND OF THE INVENTION

Field of the Invention

The present invention relates to honeycomb structures. The present invention relates to a honeycomb structure having excellent durability against erosion due to foreign matters and having excellent thermal shock resistance.

Description of the Related Art

Along with a recent rise in the awareness of environmental issues by the society as a whole, various techniques have been developed in the technical field of generating power by burning fuel, so as to remove harmful components such as nitrogen oxides from exhaust gas that is generated during burning of the fuel. For instance, various techniques have been developed to remove harmful components such as nitrogen oxides from exhaust gas emitted from an automobile engine. To remove such harmful components from exhaust gas, catalyst is typically used to cause a chemical reaction of the harmful substances and convert them into another component that is relatively harmless. A honeycomb structure is used for a catalyst carrier to load the catalyst for exhaust-gas purification.

Exhaust gas emitted from an internal combustion engine by burning contains particulate matters, such as soot, together with toxic gas, such as nitrogen oxides. Hereinafter the particulate matters may be called "PM". Regulations on the removal of PM emitted from a gasoline engine, for example, are becoming stricter worldwide. A honeycomb filter having a honeycomb structure has been used for a filter to remove such PM.

To this end, a honeycomb structure has been proposed conventionally, which includes a honeycomb structure body having an inflow end face and an outflow end face and having a porous partition wall that defines a plurality of cells, the plurality of cells extending from the inflow end face to the outflow end face and serving as a through channel of fluid (see Patent Document 1, for example).

[Patent Document 1] JP-A-2013-63422

SUMMARY OF THE INVENTION

When a honeycomb structure is used as a member to purify exhaust gas, the honeycomb structure has been requested to have a countermeasure against erosion due to foreign matters, because some exhaust systems include metal powder and metal pieces. Conventional honeycomb structures, however, have a problem that they have low durability against such erosion due to foreign matters.

Such a honeycomb structure used as a member to purify exhaust gas has been requested to have thermal shock resistance as well during heat cycle in exhaust gas at high temperatures. Therefore there is another demand for the development of honeycomb structures having excellent thermal shock resistance.

In view of such problems of the conventional techniques, the present invention provides a honeycomb structure having excellent durability against erosion due to foreign matters as well as excellent thermal shock resistance.

The present invention provides the following honeycomb structure.

[1] A honeycomb structure, including a honeycomb structure body having an inflow end face and an outflow end face, the honeycomb structure body including: a porous partition wall defining a plurality of cells extending from the inflow end face to the outflow end face and serving as a through channel of fluid; and a circumferential wall disposed to surround the partition wall, wherein the honeycomb structure body has a dense part, the dense part including a center region of the inflow end face and being a part from the center region of the inflow end face along an axial direction of the honeycomb structure body, and the dense part having a change ratio of porosity of 2 to 8%, the change ratio of porosity being calculated by the following Expression (1), and the honeycomb structure body has an outside-diameter increasing part at least at a part of the honeycomb structure body in the axial direction, the outside-diameter increasing part having an outside diameter of a plane orthogonal to the axial direction of the honeycomb structure body that increases from the inflow end face to the outflow end face, and the honeycomb structure body has a change ratio of average diameter that is 0.2 to 3%, the change ratio of average diameter being calculated by the following Expression (2).

$$(1-P_x/P_y) \times 100, \quad \text{Expression (1):}$$

where in Expression (1), $P_x$ denotes porosity (%) at the center region of the inflow end face, and $P_y$ denotes porosity (%) of a circumferential region of the inflow end face other than the center region.

$$(1-D_x/D_y) \times 100, \quad \text{Expression (2):}$$

where in Expression (2), $D_x$ denotes an average diameter (mm) of the inflow end face of the honeycomb structure body, and $D_y$ denotes an average diameter (mm) of the outflow end face of the honeycomb structure body.

[2] The honeycomb structure according to [1], wherein the center region of the inflow end face has a change ratio of porosity calculated by the above Expression (1) that is 2 to 6%.

[3] The honeycomb structure according to [1] or [2], wherein a center region of the outflow end face of the honeycomb structure body has a change ratio of porosity calculated by the following Expression (3) that is less than 2%.

$$(1-P'_x/P'_y) \times 100, \quad \text{Expression (3):}$$

where in Expression (3), $P'_x$ denotes porosity (%) at the center region of the outflow end face, and $P'_y$ denotes porosity (%) of a circumferential region of the outflow end face other than the center region.

[4] The honeycomb structure according to any one of [1] to [3], wherein the dense part has porosity of 20 to 70%.

[5] The honeycomb structure according to any one of [1] to [4], wherein the outside-diameter increasing part is present across an overall region of the honeycomb structure body in the axial direction.

[6] The honeycomb structure according to any one of [1] to [4], wherein the outside-diameter increasing part is present at only a part of the honeycomb structure body in the axial direction.

[7] The honeycomb structure according to any one of [1] to [6], wherein the circumferential wall of the honeycomb structure body includes a circumference coating layer disposed at circumference of the partition wall.

[8] The honeycomb structure according to any one of [1] to [7], further including a plugging portion disposed to plug any one of the ends of the cells in the honeycomb structure body.

A honeycomb structure of the present invention is configured so that a center region at the inflow end face of the honeycomb structure body has porosity lower than the porosity of a circumferential region at the inflow end face, and the dense part has a change ratio of porosity that is 2 to 8%. The change ratio of porosity is calculated by the above Expression (1). The honeycomb structure of the present invention is configured so that the honeycomb structure body has an outside-diameter increasing part having a change ratio of average diameter that is 0.2 to 3%. The change ratio of average diameter is calculated by the above Expression (2). With these configurations, the honeycomb structure of the present invention has the advantageous effects of having excellent durability against erosion due to foreign matters as well as excellent thermal shock resistance.

DESCRIPTION OF THE PREFERRED EMBODIMENTS

The following describes embodiments of the present invention. The present invention is not limited to the following embodiments. The present invention is therefore to be understood to include the following embodiments, to which modifications and improvements are added as needed based on the ordinary knowledge of a person skilled in the art without departing from the scope of the present invention.

(1) Honeycomb Structure (First Embodiment)

Figure 1:
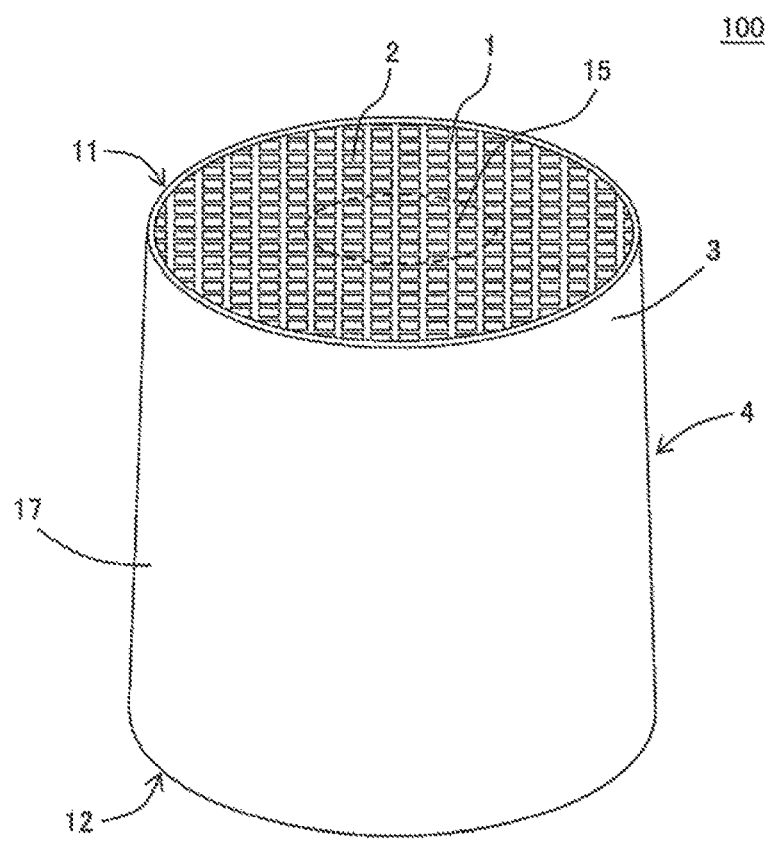
FIG. 1 is a perspective view schematically showing a first embodiment of the honeycomb structure of the present invention.
Figure 2:
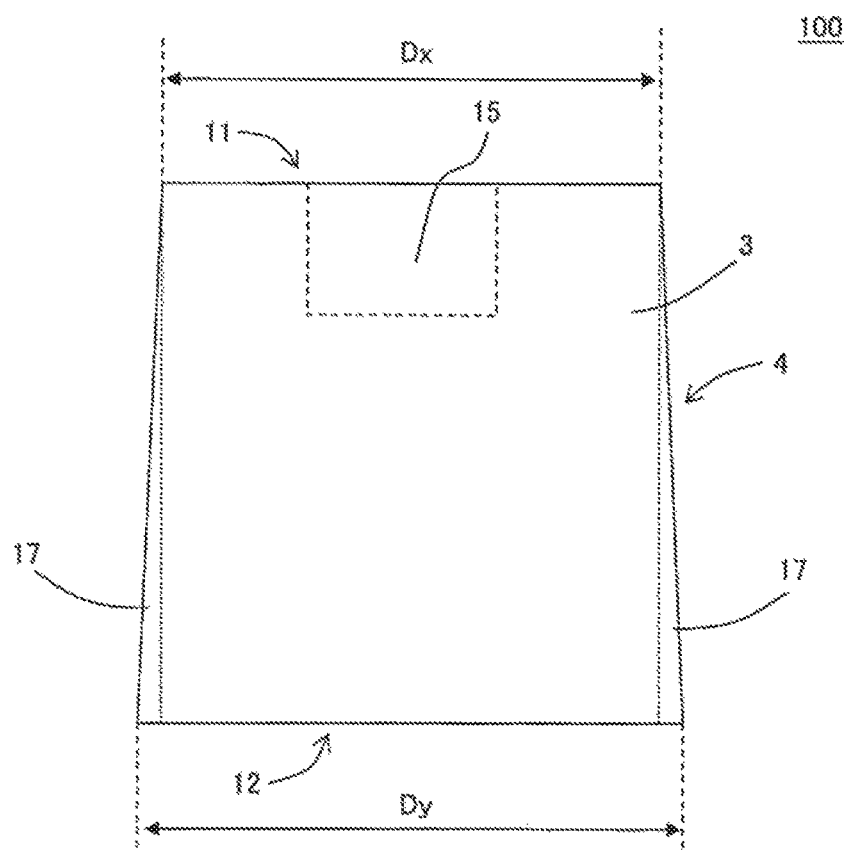
FIG. 2 is a lateral view schematically showing the lateral face of the honeycomb structure of FIG. 1.
Figure 3:
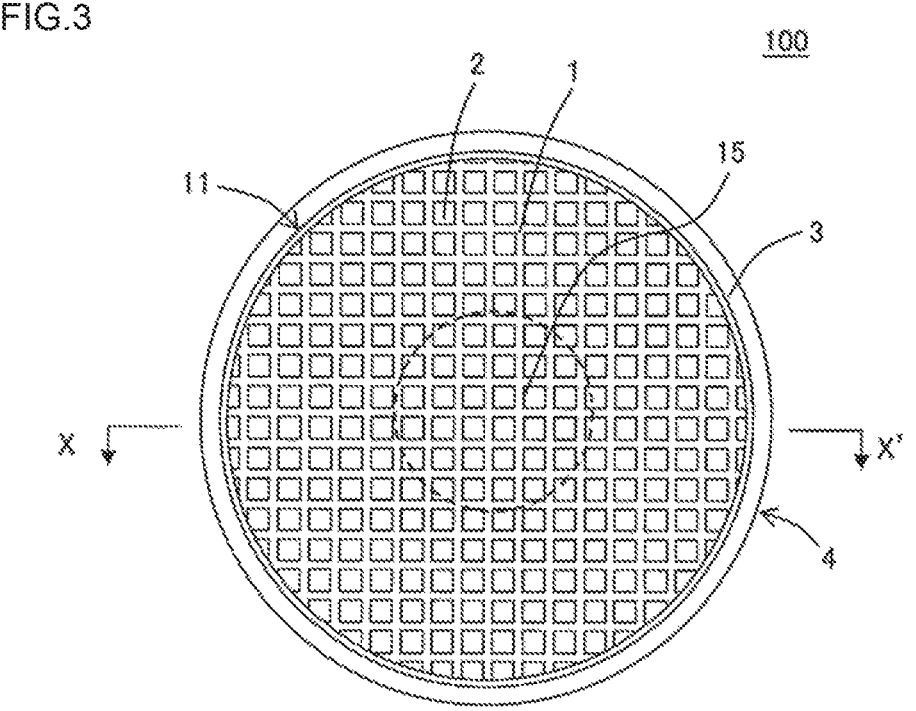
FIG. 3 is a plan view schematically showing the inflow end face of the honeycomb structure of FIG. 1.
Figure 4:
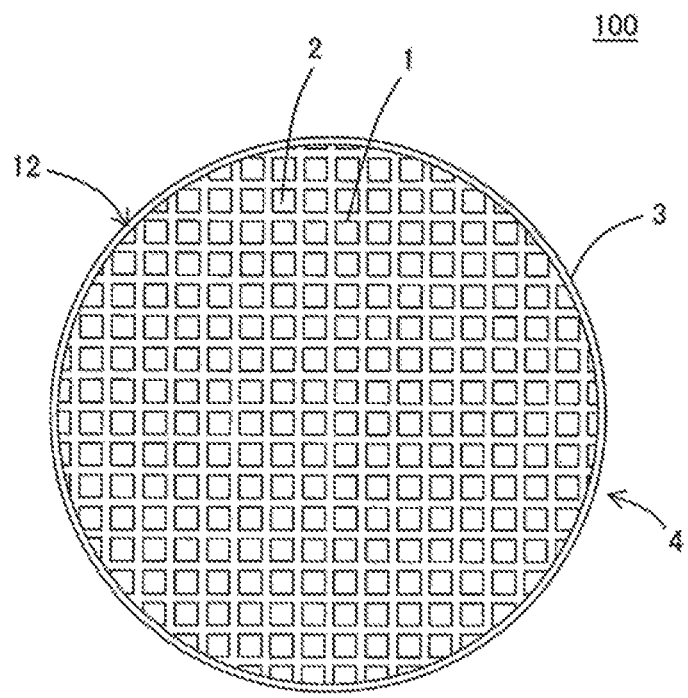
FIG. 4 is a plan view schematically showing the outflow end face of the honeycomb structure of FIG. 1.
Figure 5:
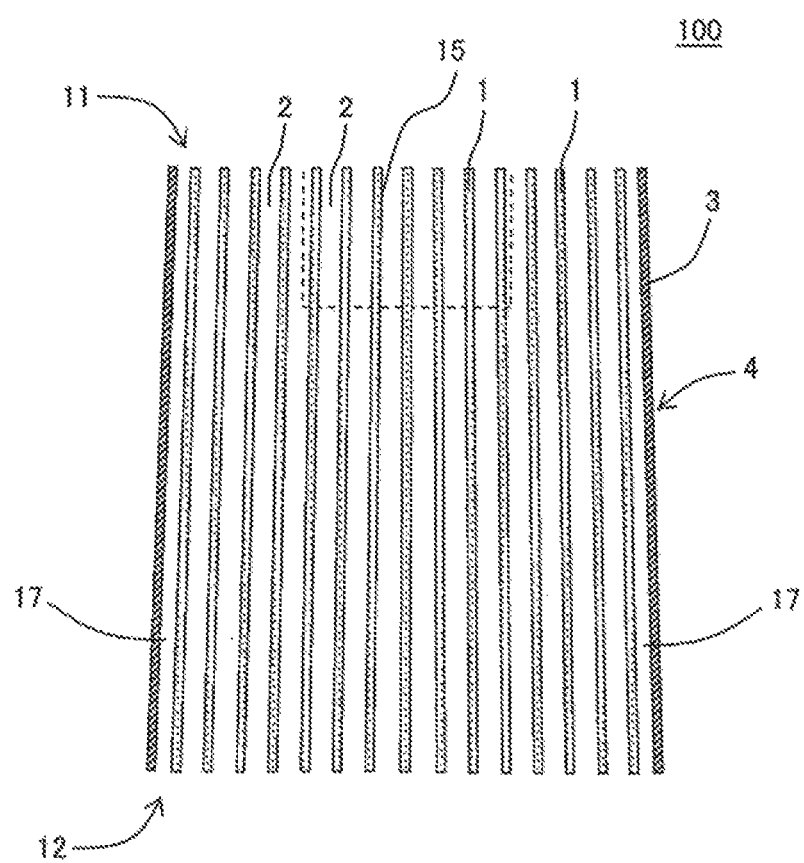
FIG. 5 is a schematic cross-sectional view taken along the line X-X' of FIG. 3.

As shown in FIGS. 1 to 5, a first embodiment of the honeycomb structure of the present invention is a honeycomb structure 100 including a honeycomb structure body 4, and the honeycomb structure body includes a porous partition wall 1 and a circumferential wall 3 disposed so as to surround the partition wall 1. FIG. 1 is a perspective view schematically showing the first embodiment of the honeycomb structure of the present invention. FIG. 2 is a lateral view schematically showing the lateral face of the honeycomb structure of FIG. 1. FIG. 3 is a plan view schematically showing the inflow end face of the honeycomb structure of FIG. 1. FIG. 4 is a plan view schematically showing the outflow end face of the honeycomb structure of FIG. 1. FIG. 5 is a schematic cross-sectional view taken along the line X-X' of FIG. 3.

The partition wall 1 of the honeycomb structure body 4 defines a plurality of cells 2, and the plurality of cells extends from an inflow end face 11 to an outflow end face 12 and serves as a through channel of fluid. The honeycomb structure body 4 has a dense part 15, and the dense part includes a center region of the inflow end face 11 and is a part from the center region of the inflow end face 11 along the axial direction of the honeycomb structure body 4. The dense part is configured so that its porosity is relatively lower. This dense part 15 has a change ratio of porosity that is 2 to 8%. The change ratio of porosity is calculated by the following Expression (1). The honeycomb structure body 4 has an outside-diameter increasing part 17 at least at a part of the honeycomb structure body 4 in the axial direction. The outside-diameter increasing part has an outside diameter of a plane orthogonal to the axial direction of the honeycomb structure body 4 that increases from the inflow end face 11 to the outflow end face 12. Due to such an outside-diameter increasing part 17, the honeycomb structure body 4 has a change ratio of average diameter that is 0.2 to 3%. The change ratio of average diameter is calculated by the following Expression (2). The honeycomb structure body 4 in FIG. 5 has the outside-diameter increasing part 17 across the overall region of the honeycomb structure body 4 in the axial direction.

$$(1-Px/Py) \times 100. \qquad \text{Expression (1):}$$

In Expression (1), Px denotes the porosity (%) at the center region of the inflow end face 11, and Py denotes the porosity (%) of a circumferential region of the inflow end face 11 other than the center region.

$$(1-Dx/Dy) \times 100. \qquad \text{Expression (2):}$$

In Expression (2), Dx denotes the average diameter (mm) of the inflow end face 11 of the honeycomb structure body 4, and Dy denotes the average diameter (mm) of the outflow end face 12 of the honeycomb structure body 4.

The honeycomb structure 100 of the present embodiment has the dense part 15 and the outside-diameter increasing part 17 as stated above, and so has the advantageous effects of having excellent durability against erosion due to foreign matters as well as excellent thermal shock resistance. Hereinafter the durability against erosion due to foreign matters may be referred to as "erosion resistance".

Since the honeycomb structure body 4 has such a dense part 15 that includes a center region of the inflow end face 11 and is a part from the center region along the axial direction of the honeycomb structure body 4, the honeycomb structure body 4 can have improved erosion resistance. When a honeycomb structure body 4 has such a dense part 15 at the center region of the inflow end face 11, however, thermal shock resistance of the honeycomb structure body 4 on the side of the outflow end face 12 may deteriorate. Then, the honeycomb structure 100 of the present embodiment is configured so that the change ratio of average diameter calculated by the above Expression (2) is 0.2 to 3%. With this configuration, a decrease in thermal shock resistance on the side of the outflow end face 12 of the honeycomb structure body 4 can be suppressed. That is, if the change ratio of average diameter of the honeycomb structure 100 is less than 0.2%, thermal shock resistance of the honeycomb structure body 4 having a dense part 15 at the center region of the inflow end face 11 will deteriorate on the side of the outflow end face 12. On the contrary, if the change ratio of average diameter of the honeycomb structure 100 exceeds 3%, thermal shock resistance on the side of the inflow end face 11 will deteriorate.

Since the honeycomb structure body 4 has the outside-diameter increasing part 17 in which the outside diameter increases from the inflow end face 11 to the outflow end face 12, its change ratio of average diameter can be within 0.2 to 3%. In the above Expression (2), Dx denotes the average diameter (mm) of the inflow end face 11 of the honeycomb structure body 4, and Dy denotes the average diameter (mm) of the outflow end face 12 of the honeycomb structure body 4. When the inflow end face 11 and the outflow end face 12 of the honeycomb structure body 4 are circular, the average diameter (mm) of the inflow end face 11 and the average diameter (mm) of the outflow end face 12 refer to the diameters (mm) of the circles. When the inflow end face 11 and the outflow end face 12 of the honeycomb structure body 4 are not circular, the average diameters (mm) are obtained by the following method. For the inflow end face 11 of the honeycomb structure body 4, the length (mm) of a long diameter and the length (mm) of a short diameter of the outside diameters passing through the geometrical center of gravity of the inflow end face 11 are measured, and their average is the average diameter (mm) of the inflow end face 11. Similarly for the outflow end face 12 of the honeycomb structure body 4, the length (mm) of a long diameter and the length (mm) of a short diameter of the outside diameters passing through the geometrical center of gravity of the outflow end face 12 are measured, and their average is the average diameter (mm) of the outflow end face 12. Hereinafter the "average diameter Dx" refers to the average diameter (mm) of the inflow end face 11. The "average diameter Dy" refers to the average diameter (mm) of the outflow end face 12.

Figure 6:
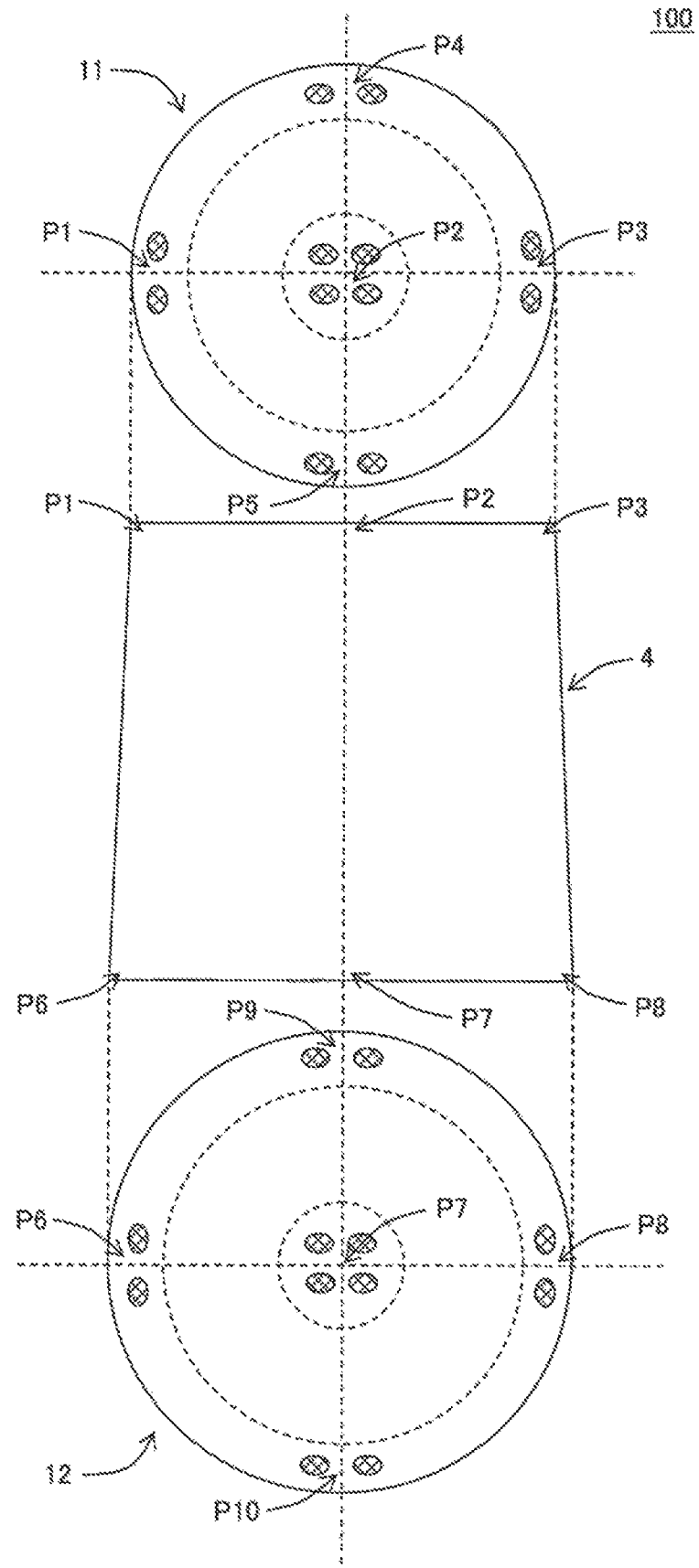
FIG. 6 is a schematic view to explain the measurement points of porosity of the honeycomb structure body in the first embodiment of the honeycomb structure of the present invention.

The dense part 15 of the honeycomb structure body 4 is present at a part from the center region of the inflow end face 11 along the axial direction of the honeycomb structure body 4. The following describes how to measure the porosity at the center region of the inflow end face 11 of the honeycomb structure body 4 and the porosity of the circumferential region of the inflow end face 11 in more detail, with reference to FIG. 6. The following also describes how to measure the porosity at the center region of the outflow end face 12 of the honeycomb structure body 4 and the porosity of the circumferential region of the outflow end face 12. FIG. 6 is a schematic view to explain the measurement points of porosity of the honeycomb structure body in the first embodiment of the honeycomb structure of the present invention. In FIG. 6, a part indicated with reference numeral 11 in the upper part of the sheet shows the inflow end face 11 of the honeycomb structure body 4. In FIG. 6, a part indicated with reference numeral 4 at the center of the sheet shows a cross section of the honeycomb structure body 4 taken along the axial direction. This cross section in FIG. 6 is drawn while omitting the partition wall 1 and the cells 2 of the honeycomb structure body 4. In FIG. 6, a part indicated with reference numeral 12 in the lower part of the sheet shows the outflow end face 12 of the honeycomb structure body 4. The axial direction of the honeycomb structure body 4 refers to the direction from the inflow end face 11 to the outflow end face of the honeycomb structure body 4.

When the porosity of the honeycomb structure body 4 is measured, porosity of the partition wall of the honeycomb structure body 4 is measured at the positions indicated with reference numerals P1 to P5 on the side of the inflow end face 11 of the honeycomb structure body 4 and the positions indicated with reference numerals P6 to P10 on the side of the outflow end face 12 of the honeycomb structure body 4, i.e., at 10 positions in total. The porosity [%] of the honeycomb structure body 4 is a value measured with a mercury porosimeter. An example of the mercury porosimeter includes Autopore 9500 (product name) produced by Micromeritics Co.

In the inflow end face 11 of FIG. 6, the position indicated with reference numeral P2 is the center region of the inflow end face 11. The center region of the inflow end face 11 indicated with reference numeral P2 is the range corresponding to 10% of the diameter of the inflow end face 11 of the honeycomb structure body 4 from the center of the inflow end face 11. Hereinafter the center region of the inflow end face 11 in such a range may be referred to as "center region P2 of the inflow end face 11" or simply as "center region P2". In the center region P2, porosity is measured at any four points in this region, and their average is the porosity (%) of the center region P2.

In the inflow end face 11 of FIG. 6, the positions indicated with reference numerals P1, P3 to P5 are the circumferential regions of the inflow end face 11. The circumferential regions of the inflow end face 11 indicated with reference numerals P1, P3 to P5 are the annular range corresponding to 10% of the diameter of the inflow end face 11 of the honeycomb structure body 4 from the outermost circumference to the inside of the inflow end face 11. Hereinafter the circumferential region of the inflow end face 11 in such a range may be referred to as "circumferential region P1, P3 to P5 of the inflow end face 11" or simply as "circumferential region P1, P3 to P5". In the circumferential regions P1, P3 to P5, porosity is measured at any two points in each of the regions, and their average is the porosity (%) of the corresponding circumferential region P1, P3 to P5.

In the outflow end face 12 of FIG. 6, the position indicated with reference numeral P7 is the center region of the outflow end face 12. The center region of the outflow end face 12 indicated with reference numeral P7 is the range corresponding to 10% of the diameter of the outflow end face 12 of the honeycomb structure body 4 from the center of the outflow end face 12. Hereinafter the center region of the outflow end face 12 in such a range may be referred to as "center region P7 of the outflow end face 12" or simply as "center region P7". In the center region P7, porosity is measured at any four points in this region, and their average is the porosity (%) of the center region P7.

In the outflow end face 12 of FIG. 6, the positions indicated with reference numerals P6, P8 to P10 are the circumferential regions of the outflow end face 12. The circumferential regions of the outflow end face 12 indicated with reference numerals P6, P8 to P10 are the annular range corresponding to 10% of the diameter of the outflow end face 12 of the honeycomb structure body 4 from the outermost circumference to the inside of the outflow end face 12. Hereinafter the circumferential region of the outflow end face 12 in such a range may be referred to as "circumferential region P6, P8 to P10 of the outflow end face 12" or simply as "circumferential region P6, P8 to P10". In the circumferential regions P6, P8 to P10, porosity is measured at any two points in each of the regions, and their average is the porosity (%) of the corresponding circumferential region P6, P8 to P10.

In the honeycomb structure 100 of the present embodiment shown in FIGS. 1 to 5, the porosity (%) of the center region P2 is lower than the porosity (%) of each of the circumferential regions P1, P3 to P5.

In the honeycomb structure 100 of the present embodiment, the change ratio of porosity calculated by the above Expression (1) is 2 to 8%, preferably 2 to 7%, and particularly preferably 2 to 6% at the center region of the inflow end face 11. That is, in the honeycomb structure 100 of the present embodiment, the change ratio of porosity at the dense part 15 of the honeycomb structure body 4 is 2 to 6% particularly preferably.

In the above Expression (1), "Px" denotes the "porosity (%) at the center region P2 of the inflow end face 11" obtained by the method as stated above. In the above Expression (1), "Py" denotes the "average of porosity (%) at the circumferential regions P1, P3 to P5" obtained by the method as stated above.

If the change ratio of porosity of the dense part 15 of the honeycomb structure body 4 is less than 2%, sufficient erosion resistance cannot be obtained. If the change ratio of porosity is less than 2%, thermal shock resistance on the side of the inflow end face 11 of the honeycomb structure body 4 will deteriorate. On the contrary, if the change ratio of porosity exceeds 8%, thermal shock resistance on the side of the outflow end face 12 of the honeycomb structure body 4 will deteriorate. The honeycomb structure 100 of the present embodiment has the outside-diameter increasing part 17 at the honeycomb structure body 4, and therefore the honeycomb structure has the advantageous effect of suppressing deterioration in thermal shock resistance. In this honeycomb structure, the change ratio of porosity of the dense part 15 is within a certain numerical range. Then, the honeycomb structure can have particularly excellent erosion resistance and thermal shock resistance due to synergetic effect of these advantageous effects.

The dense part 15 of the honeycomb structure body 4 is present at a part from the center region of the inflow end face 11 along the axial direction of the honeycomb structure body 4. This means that the outflow end face 12 of the honeycomb structure body 4 preferably does not include such a dense part 15 as in the inflow end face 11. For instance, the honeycomb structure body 4 has the change ratio of porosity calculated by the following Expression (3) that is less than 2% preferably at the center region of the outflow end face 12, and more preferably less than 1.5%.

$$(1-P'x/P'y) \times 100. \qquad \text{Expression (3):}$$

In Expression (3), P'x denotes the porosity (%) at the center region of the outflow end face, and P'y denotes the porosity (%) of a circumferential region of the outflow end face other than the center region.

In the above Expression (3), "P'x" is the "porosity (%) at the center region P7 of the outflow end face 12" obtained by the method as stated above. In the above Expression (3), "P'y" is the "average of porosity (%) at the circumferential regions P6, P8 to P10" obtained by the method as stated above.

The dense part 15 of the honeycomb structure body 4 preferably has porosity of 20 to 70%, more preferably 22 to 66%, and particularly preferably 24 to 63%. The porosity of the dense part 15 of the honeycomb structure body 4 is the "porosity (%) at the center region P2 of the inflow end face 11" in FIG. 6.

In the honeycomb structure 100 of the present embodiment, the partition wall 1 preferably has a thickness of 40 to 350 μm, more preferably 50 to 300 μm, and particularly preferably 60 to 260 μm. If the thickness of the partition wall 1 is less than 40 μm, isostatic strength of the honeycomb structure body 4 may deteriorate. If the thickness of the partition wall 1 exceeds 350 μm, pressure loss will increase, which may reduce output from the engine or degrade the fuel consumption. The thickness of the partition wall 1 is a value measured by observing a cross section orthogonal to the axial direction of the honeycomb structure 100 under an optical microscope.

The honeycomb structure 100 of the present embodiment preferably has a cell density of the cells 2 defined by the partition wall 1 that is 30 to 150 cells/cm$^2$, and 34 to 140 cells/cm$^2$ more preferably. The thus configured honeycomb structure 100 of the present embodiment can be preferably used as a catalyst carrier for exhaust-gas purification, a filter or the like.

The partition wall 1 and the circumferential wall 3 preferably include ceramic as a main component. Preferable examples of the material of the partition wall 1 and the circumferential wall 3 include at least one type selected from the group consisting of cordierite, silicon carbide, silicon-silicon carbide based composite materials, mullite, alumina, aluminum titanate, silicon nitride, cordierite forming raw material, lithium aluminum silicate, and silicon carbide-cordierite based composite materials. "Including ceramic as a main component" means that ceramic accounts for 50 mass% or more in the materials as a whole.

The circumferential wall 3 of the honeycomb structure body 4 may be monolithic with the partition wall 1 defining the cells 2 or may be a circumference coating layer that is formed by applying a circumference coating material at the circumference of the partition wall 1 defining the cells 2. During the manufacturing process, a partition wall 1 and a circumferential wall 3 may be formed in a monolithic manner, and then the circumferential wall 3 formed may be removed by a known method, such as grinding. Then, the circumference coating layer may be disposed at the circumference of the partition wall 1.

The shape of the cells 2 in the honeycomb structure body 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively.

The shape of the honeycomb structure body 4 is not limited especially. Examples of the shape of the honeycomb structure body 4 include a pillar shape in which the inflow end face 11 and the outflow end face 12 have a shape, such as a circle, an ellipse, and a polygon. Note here that, since the honeycomb structure 100 of the present embodiment has an outside-diameter increasing part 17 as stated above, it has a frustum shape at least at a part thereof in a strict sense. When the inflow end face 11 and the outflow end face 12 are circular, the honeycomb structure body 4 has a truncated circular cone shape. Examples of the polygonal shape include a quadrangle, a pentagon, a hexagon, a heptagon, and an octagon.

The size of the honeycomb structure body 4, e.g., the length from the inflow end face 11 to the outflow end face 12 and the size of a cross section orthogonal to the extending direction of the cells 2 of the honeycomb structure body 4, is not limited especially. The size of the honeycomb structure 100 of the present embodiment may be selected appropriately so that it can have the optimum ability for purification when it is used as a member to purify exhaust gas. For instance, the length from the inflow end face 11 to the outflow end face 12 of the honeycomb structure body 4 is preferably 40 to 200 mm, and particularly preferably 50 to 190 mm. The area of a cross section orthogonal to the extending direction of the cells 2 of the honeycomb structure body 4 is preferably 3000 to 120000 mm$^2$, and particularly preferably 4500 to 100000 mm$^2$.

In the honeycomb structure 100 of the present embodiment, at least one of the surface of the partition wall 1 and the pores of the partition wall 1 of the honeycomb structure body 4 may be loaded with catalyst for exhaust-gas purification. The thus configured honeycomb structure can convert CO, NOx, HC or the like in the exhaust gas into harmless substances through the catalytic reaction.

(2) Honeycomb Structure (Second Embodiment)

The following describes a second embodiment of the honeycomb structure of the present invention. As shown in FIGS. 7 to 11, another embodiment of the honeycomb structure of the present invention is a honeycomb structure 200 including a honeycomb structure body 4 having a porous partition wall 1 and a plugging portion 5 disposed at any one of the ends of cells 2 formed in the honeycomb structure body 4. The porous partition wall 1 defines the plurality of cells 2, and the plurality of cells extends from an inflow end face 11 to an outflow end face 12 and serves as a through channel of fluid. The plugging portion 5 is disposed at open ends of the cells 2 at the inflow end face 11 or the outflow end face 12 to plug any one of the ends of the cells 2. The plurality of cells 2 include inflow cells 2a, in which the plugging portion 5 is disposed at open ends of the outflow end face 12, and the cells 2 are open at the inflow end face 11. The plurality of cells 2 include outflow cells 2b as well, in which the plugging portion 5 is disposed at open ends of the inflow end face 11, and the cells 2 are open at the outflow end face 12.

Figure 7:
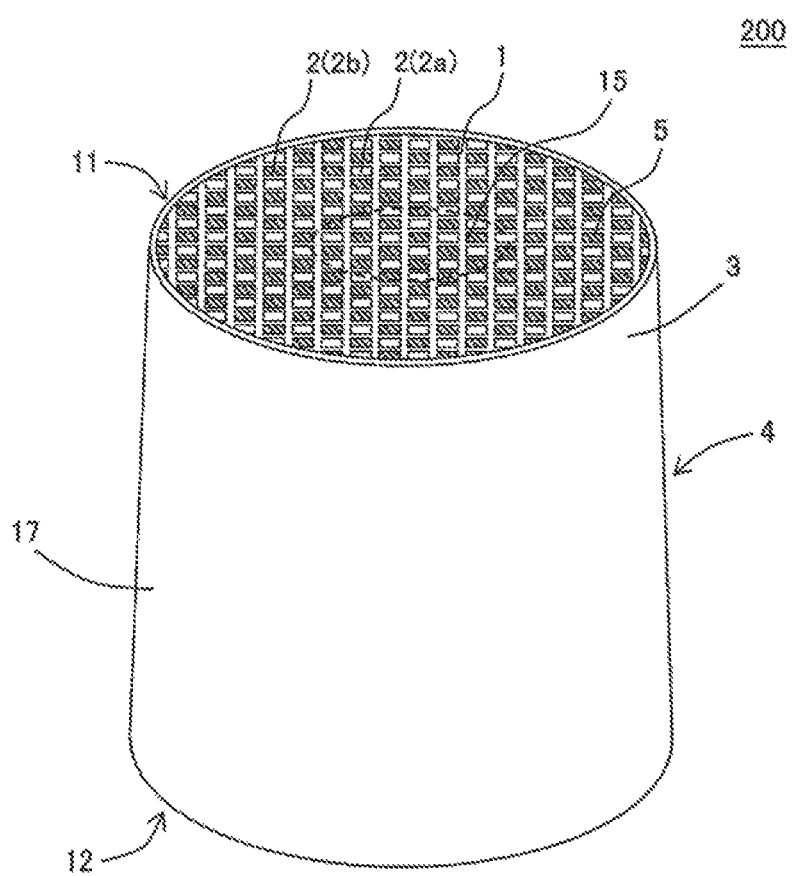
FIG. 7 is a perspective view schematically showing a second embodiment of the honeycomb structure of the present invention.
Figure 8:
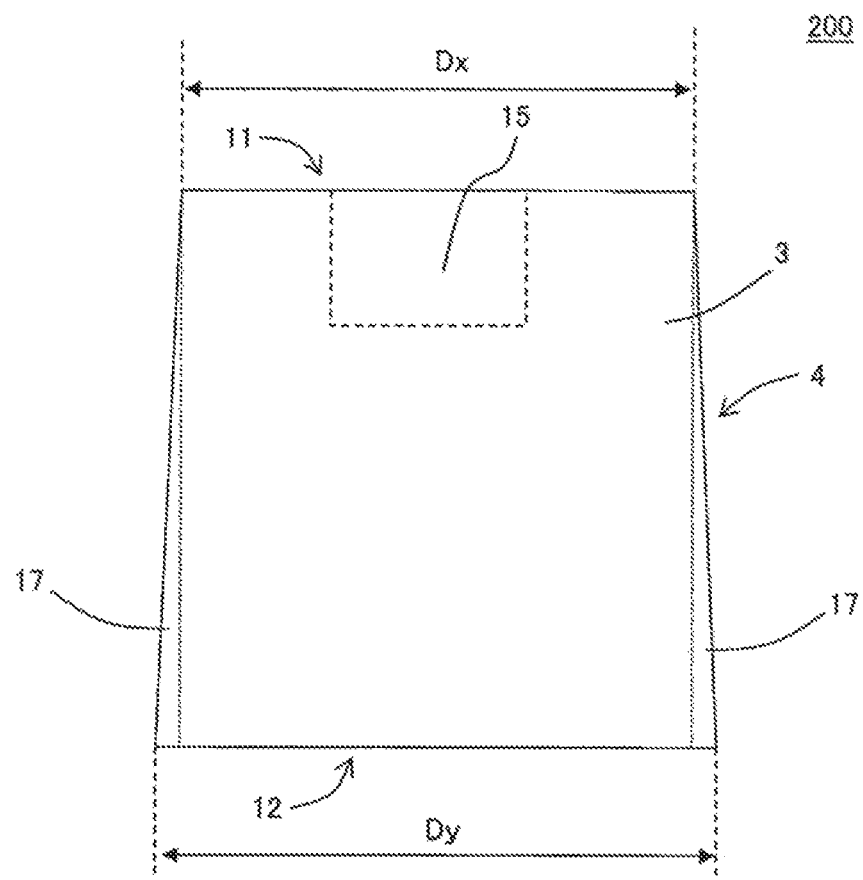
FIG. 8 is a lateral view schematically showing the lateral face of the honeycomb structure of FIG. 7.
Figure 9:
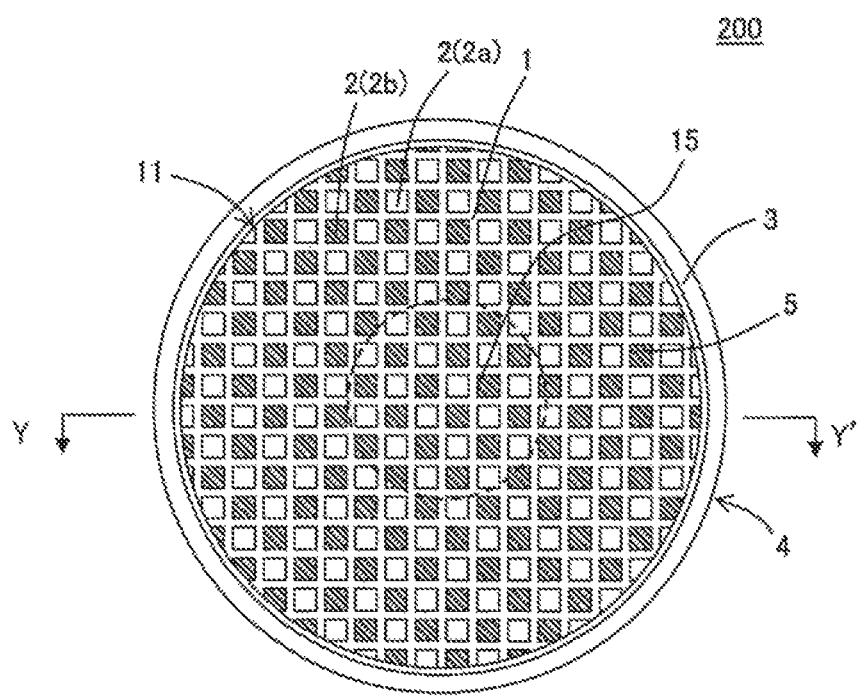
FIG. 9 is a plan view schematically showing the inflow end face of the honeycomb structure of FIG. 7.
Figure 10:
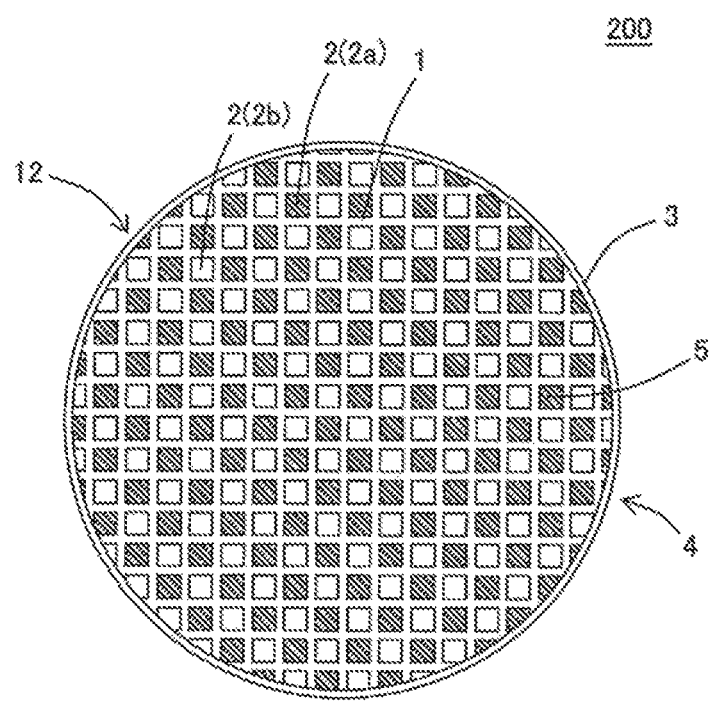
FIG. 10 is a plan view schematically showing the outflow end face of the honeycomb structure of FIG. 7.
Figure 11:
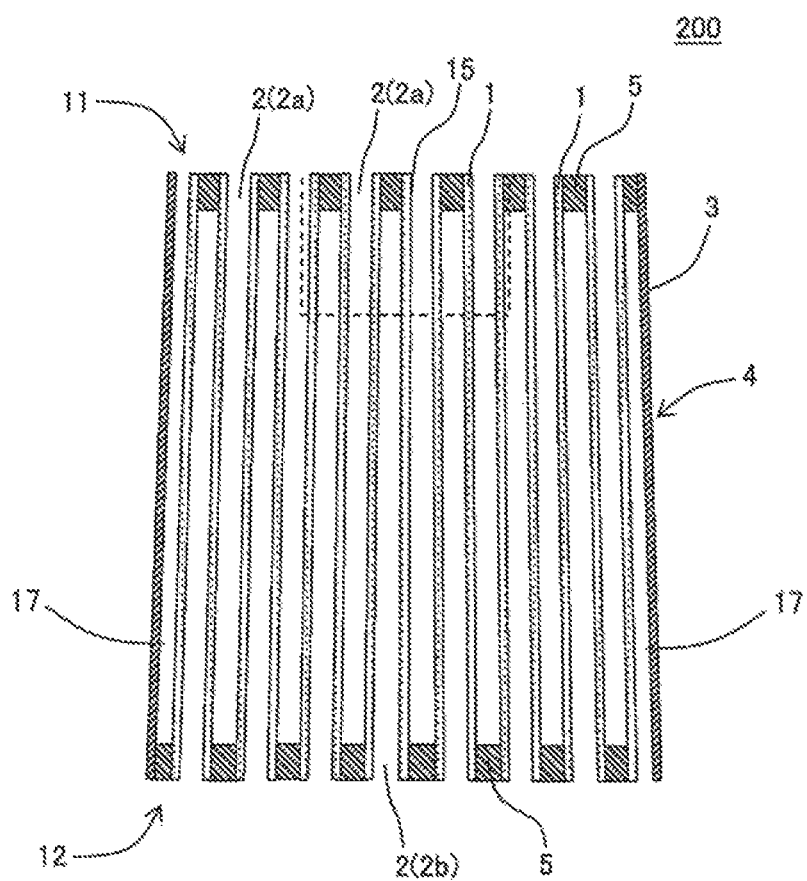
FIG. 11 is a schematic cross-sectional view taken along the line Y-Y' of FIG. 9.

FIG. 7 is a perspective view schematically showing the second embodiment of the honeycomb structure of the present invention. FIG. 8 is a lateral view schematically showing the lateral face of the honeycomb structure of FIG. 7. FIG. 9 is a plan view schematically showing the inflow end face of the honeycomb structure of FIG. 7. FIG. 10 is a plan view schematically showing the outflow end face of the honeycomb structure of FIG. 7. FIG. 11 is a schematic cross-sectional view taken along the line Y-Y' of FIG. 9.

The honeycomb structure body 4 in the honeycomb structure 200 shown in FIGS. 7 to 10 has the same configuration as that of the honeycomb structure body 4 shown in FIGS. 1 to 5. That is, the honeycomb structure body 4 has a dense part 15, and the dense part includes a center region of the inflow end face 11 and is a part from the center region of the inflow end face 11 along the axial direction of the honeycomb structure body 4. The dense part is configured so that its porosity is relatively lower. This dense part 15 has a change ratio of porosity that is 2 to 8%. The change ratio of porosity is calculated by the above Expression (1). The honeycomb structure body 4 has an outside-diameter increasing part 17 at least at a part of the honeycomb structure body 4 in the axial direction. The outside-diameter increasing part has an outside diameter of a plane orthogonal to the axial direction of the honeycomb structure body 4 that increases from the inflow end face 11 to the outflow end face 12. Due to such an outside-diameter increasing part 17, the honeycomb structure body 4 has a change ratio of average diameter that is 0.2 to 3%. The change ratio of average diameter is calculated by the above Expression (2).

The thus configured honeycomb structure 200 also has the advantageous effects similar to those of the honeycomb structure 100 shown in FIGS. 1 to 5. That is, the honeycomb structure 200 also has the advantageous effects of having excellent erosion resistance as well as excellent thermal shock resistance.

The plugging portion 5 is disposed at open ends of predetermined cells 2 of the plurality of cells 2 on the side of the inflow end face 11 and at open ends of residual cells 2 other than the predetermined cells 2 on the side of the outflow end face 12. As stated above, each of the plurality of cells 2 is plugged at their open ends on any one of the ends with the plugging portion 5. The thus configured honeycomb structure 200 of the present embodiment can be used as a filter to purify exhaust gas. The honeycomb structure 200 shown in FIGS. 7 to 10 can be particularly preferably used for a filter for gasoline engines. A gasoline engine generates less soot during emission of exhaust gas than that from a diesel engine. Therefore forced regeneration to forcibly burn soot trapped by the filter for removal is not required for a filter for gasoline engines. However, a filter for gasoline engines is successively exposed to exhaust gas at high temperatures, and therefore it requires thermal shock resistance during heat cycle in exhaust gas at high temperatures. The honeycomb structure 200 of the present embodiment has excellent thermal shock resistance, and therefore it can satisfy the property required for a filter for gasoline engines.

In the honeycomb structure 200 of the present embodiment, the inflow cells 2a and the outflow cells 2b may have the same shape, or the inflow cells 2a and the outflow cells 2b may have different shapes. For instance, although not shown, inflow cells may have an octagonal shape, and outflow cells may have a quadrangular shape. For the size of the cells 2, all of the cells 2 may have the same size, or the cells 2 may have different sizes. For instance, although not shown, inflow cells of the plurality of cells may be larger, and outflow cells may be smaller than the inflow cells.

Conversely, inflow cells of the plurality of cells may be smaller, and outflow cells may be relatively larger than the inflow cells. Some of the inflow cells may have a different size from the others. Some of the outflow cells may have a different size from the others.

The arrangement of the inflow cells 2a and the outflow cells 2b in the honeycomb structure body 4 is not limited especially, and preferably one of the inflow cells 2a and at least one of the outflow cell 2b are disposed so that they are adjacent each other and separated by the partition wall 1. For instance, when the cells 2 have a quadrangular shape, the inflow cells 2a and the outflow cells 2b are arranged alternately via the partition wall 1 so that both end faces of the honeycomb structure body 4 appear like a complementary checkerboard pattern.

(3) Honeycomb Structure (Third Embodiment to Eighth Embodiment)

Figure 12:
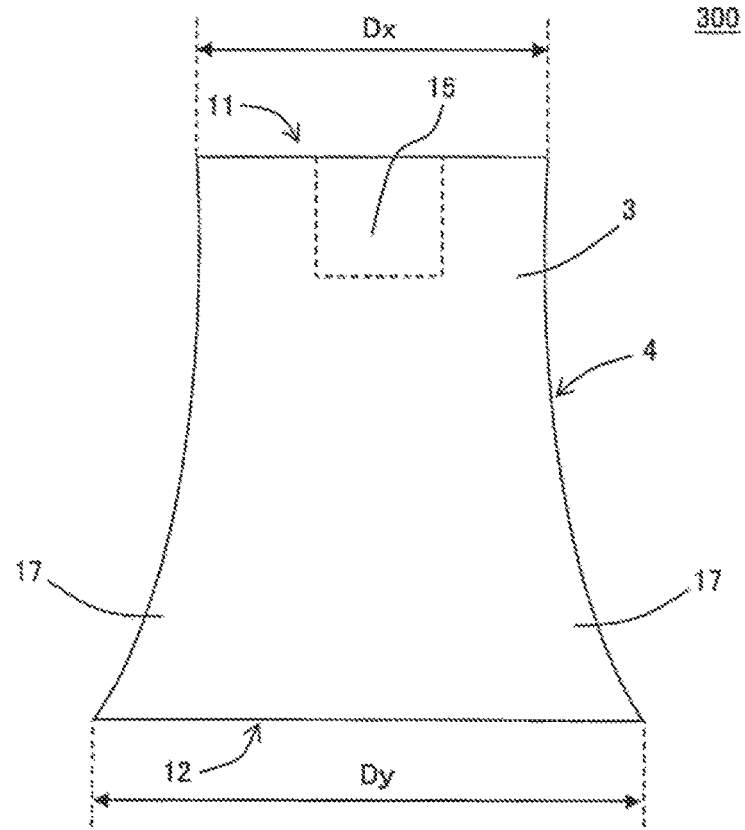
FIG. 12 is a lateral view schematically showing a third embodiment of the honeycomb structure of the present invention.
Figure 13:
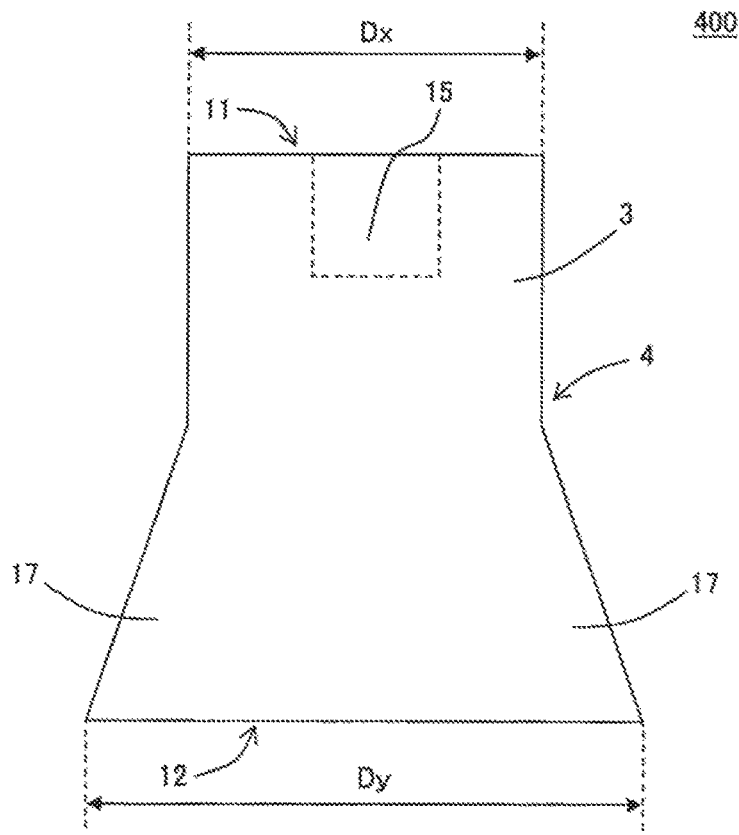
FIG. 13 is a lateral view schematically showing a fourth embodiment of the honeycomb structure of the present invention.
Figure 14:
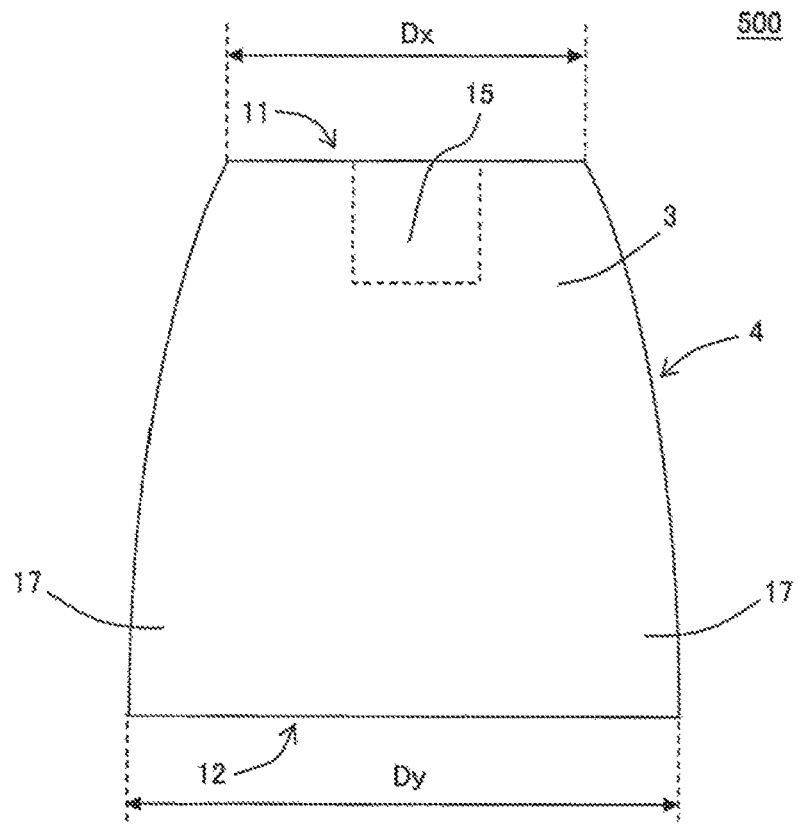
FIG. 14 is a lateral view schematically showing a fifth embodiment of the honeycomb structure of the present invention.
Figure 15:
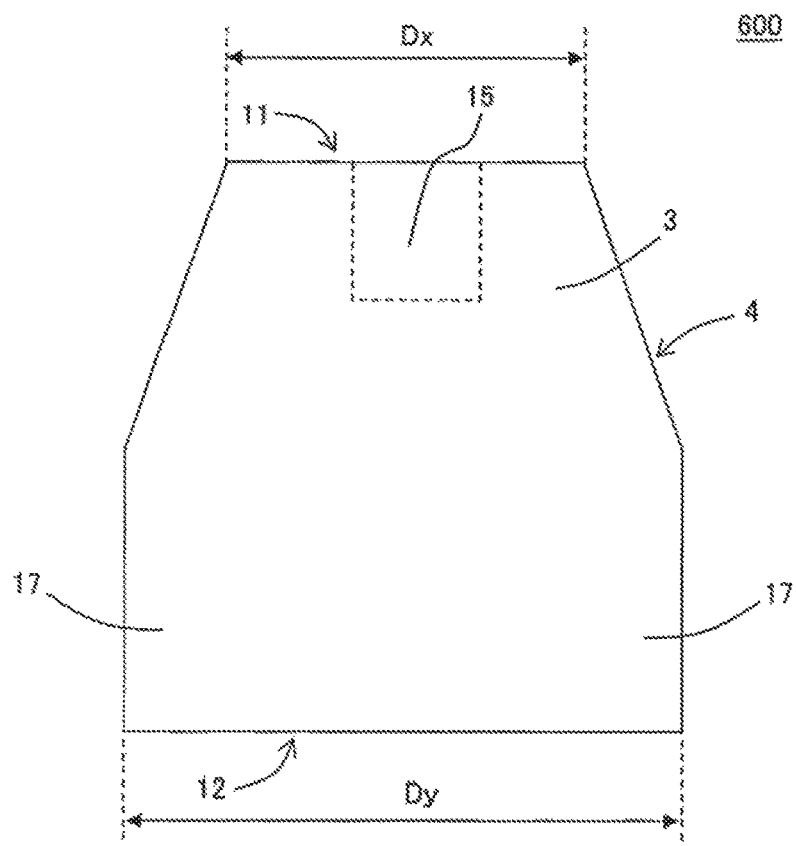
FIG. 15 is a lateral view schematically showing a sixth embodiment of the honeycomb structure of the present invention.
Figure 16:
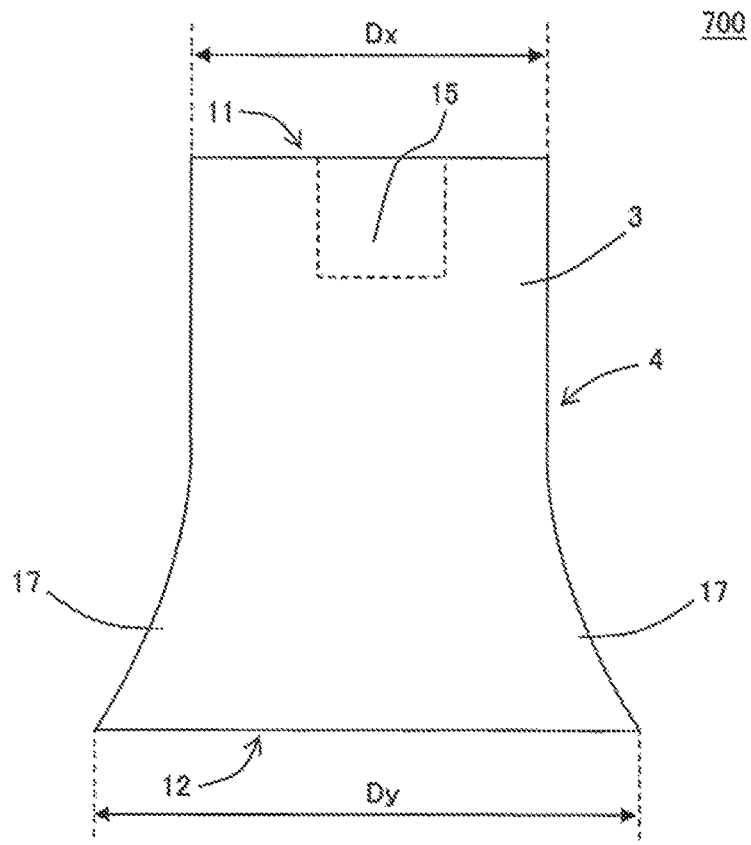
FIG. 16 is a lateral view schematically showing a seventh embodiment of the honeycomb structure of the present invention.
Figure 17:
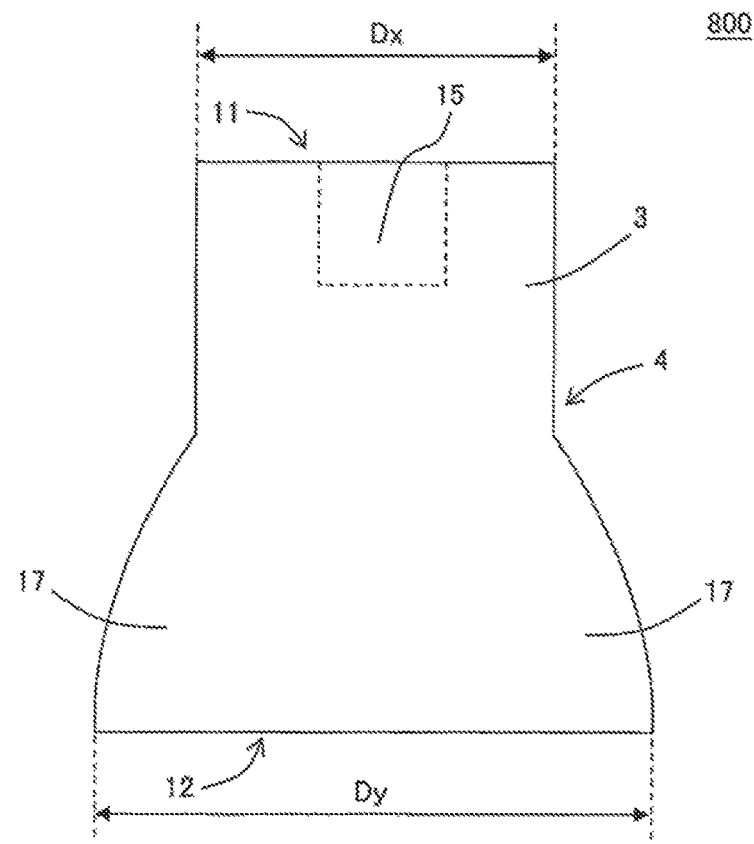
FIG. 17 is a lateral view schematically showing an eighth embodiment of the honeycomb structure of the present invention.

The following describes third to eighth embodiments of the honeycomb structure of the present invention, with reference to FIGS. 12 to 17. FIG. 12 is a lateral view schematically showing a third embodiment of the honeycomb structure of the present invention. FIG. 13 is a lateral view schematically showing a fourth embodiment of the honeycomb structure of the present invention. FIG. 14 is a lateral view schematically showing a fifth embodiment of the honeycomb structure of the present invention. FIG. 15 is a lateral view schematically showing a sixth embodiment of the honeycomb structure of the present invention. FIG. 16 is a lateral view schematically showing a seventh embodiment of the honeycomb structure of the present invention. FIG. 17 is a lateral view schematically showing an eighth embodiment of the honeycomb structure of the present invention.

The honeycomb structures of third to eighth embodiments are configured similarly to the honeycomb structure bodies 4 of FIGS. 1 to 5 other than that the shape of the lateral faces of the honeycomb structure bodies are configured as in the honeycomb structure bodies 4 shown in FIGS. 12 to 17, respectively. That is, the honeycomb structure body 4 has a dense part 15, and the dense part includes a center region of the inflow end face 11 and is a part from the center region of the inflow end face 11 along the axial direction of the honeycomb structure body 4. The dense part is configured so that its porosity is relatively lower. This dense part 15 has a change ratio of porosity that is 2 to 8%. The change ratio of porosity is calculated by the above Expression (1). The honeycomb structure body 4 has an outside-diameter increasing part 17 at least at a part of the honeycomb structure body 4 in the axial direction. The outside-diameter increasing part has an outside diameter of a plane orthogonal to the axial direction of the honeycomb structure body 4 that increases from the inflow end face 11 to the outflow end face 12. Due to such an outside-diameter increasing part 17, the honeycomb structure body 4 has a change ratio of average diameter that is 0.2 to 3%. The change ratio of average diameter is calculated by the above Expression (2).

The honeycomb structure 300 of the third embodiment shown in FIG. 12 has a circumferential wall 3 making up the lateral face of the honeycomb structure body 4, and the circumferential wall has a shape that spreads out wide from the inflow end face 11 to the outflow end face 12. This part of the shape that spreads out wide is the outside-diameter increasing part 17 of the honeycomb structure body 4.

The honeycomb structure 400 of the fourth embodiment shown in FIG. 13 has a circumferential wall 3 making up the lateral face of the honeycomb structure body 4, and the circumferential wall has a pillar shape such that it does not change in outside diameter in a certain range from the inflow end face 11. Then the circumferential wall 3 making up the lateral face of the honeycomb structure body 4 has a truncated circular conical shape on the side of the outflow end face 12. This part of the truncated circular conical shape is the outside-diameter increasing part 17 of the honeycomb structure body 4.

The honeycomb structure 500 of the fifth embodiment shown in FIG. 14 has a circumferential wall 3 making up the lateral face of the honeycomb structure body 4, and the circumferential wall has a temple bell shape hanged from the inflow end face 11 to the outflow end face 12. This part of the temple bell shape is the outside-diameter increasing part 17 of the honeycomb structure body 4.

The honeycomb structure 600 of the sixth embodiment shown in FIG. 15 has a circumferential wall 3 making up the lateral face of the honeycomb structure body 4, and the circumferential wall 3 making up the lateral face of the honeycomb structure body 4 has a truncated circular conical shape in a certain range from the inflow end face 11. Then the circumferential wall has a pillar shape that does not change in outside diameter on the side of the outflow end face 12. This part of the truncated circular conical shape is the outside-diameter increasing part 17 of the honeycomb structure body 4.

The honeycomb structure 700 of the seventh embodiment shown in FIG. 16 has a circumferential wall 3 making up the lateral face of the honeycomb structure body 4, and the circumferential wall has a pillar shape such that it does not change in outside-diameter in a certain range from the inflow end face 11. Then the circumferential wall 3 making up the lateral face of the honeycomb structure body 4 has a shape that spreads out wide on the side of the outflow end face 12. This part of the shape that spreads out wide is the outside-diameter increasing part 17 of the honeycomb structure body 4.

The honeycomb structure 800 of the eighth embodiment shown in FIG. 17 has a circumferential wall 3 making up the lateral face of the honeycomb structure body 4, and the circumferential wall has a pillar shape such that it does not change in outside-diameter in a certain range from the inflow end face 11. Then the circumferential wall 3 making up the lateral face of the honeycomb structure body 4 has a temple bell shape on the side of the outflow end face 12. This part of the temple bell shape is the outside-diameter increasing part 17 of the honeycomb structure body 4.

The shape of the circumference of the honeycomb structure body of the honeycomb structure of the present invention, i.e., the shape of the honeycomb structure body in a lateral view is not limited to those in the first to the eighth embodiments described above. That is, the shape of the circumference of the honeycomb structure of the present invention can be decided appropriately depending on the usage or the like, as long as the honeycomb structure has an outside-diameter increasing part of a desired shape so that the change ratio of average diameter calculated by the above Expression (2) is 0.2 to 3%.

(4) Method for Manufacturing Honeycomb Structure

The following describes a method for manufacturing the honeycomb structure of the present invention. A method for manufacturing the honeycomb structure of the present invention may include a step of manufacturing a honeycomb formed body and a step of drying and firing the honeycomb formed body.

(4-1) Forming Step:

A forming step is to extrude a kneaded material, which is prepared by kneading a forming raw material, into a honeycomb shape, so as to obtain a honeycomb formed body. The honeycomb formed body has a partition wall defining cells extending from a first end face to a second end face of the honeycomb formed body, and a circumferential wall that surrounds the outermost circumference of this partition wall. The honeycomb structured part made up of the partition wall is the honeycomb structure body. In the forming step, a forming raw material is firstly kneaded to be a kneaded material. Next, the obtained kneaded material is extruded, so that a honeycomb formed body is obtained, in which the partition wall and the circumferential wall are monolithically formed.

The forming raw material preferably includes dispersing medium and additives added to a ceramic raw material. Examples of the additives include organic binders, pore former and surfactant. Examples of the dispersing medium include water. The forming raw material used may be a forming raw material that is used in a conventionally-known method for manufacturing a honeycomb structure.

A method for preparing a kneaded material by kneading the forming raw material may be a method using a kneader or a vacuum pugmill, for example. In the extrusion, a die for extrusion may be used, and the die has a slit thereon corresponding to the cross-sectional shape of the honeycomb formed body.

(4-2) Firing Step:

A firing step is to fire the honeycomb formed body to have a honeycomb structure. Before firing the honeycomb formed body, the obtained honeycomb formed body may be dried by microwaves and hot air, for example. When a honeycomb structure having a plugging portion is to be manufactured, after drying the honeycomb formed body, a plugging portion may be formed by plugging the open ends of the cells with a material similar to the material of the honeycomb formed body. After forming the plugging portion, the honeycomb formed body may be dried again.

The temperature of firing to fire the honeycomb formed body may be decided appropriately depending on the material of the honeycomb formed body. For instance, when a honeycomb formed body is made of cordierite, the temperature for firing is preferably 1380 to 1450° C., and more preferably 1400 to 1440° C. The firing time is preferably about 4 to 6 hours, which is a time to keep the highest temperature.

When the honeycomb structure of the present invention is manufactured, firing is preferably performed at this firing step under a firing condition in which the center region to be the dense part on the side of the end face to be the inflow end face of the honeycomb formed body is delayed to reach a high temperature compared to the other parts. With this configuration, a dense part can be formed so that the porosity at the center region at the inflow end face of the honeycomb structure to be obtained is lower than the porosity of the circumferential region.

For instance, the honeycomb formed body may be fired by a firing oven that is used for firing a honeycomb formed body, from which fat, organic, substances and the like have been removed, under an inert gas atmosphere at high temperature. The firing oven has a longitudinal shape, which is for main firing of a honeycomb formed body. In this firing oven, the honeycomb formed body is introduced into the inside of the oven from one open ends, and is fired while being conveyed at a fixed speed along the horizontal direction until the honeycomb formed body reaches the other open end of the oven. At this time, firing is preferably performed as follows, for example. Firstly, a honeycomb formed body is placed so that its axial direction is parallel to the vertical direction, and the inflow end face of the honeycomb formed body faces downward. Then, the thus placed honeycomb formed body is fired preferably so that at the inflow end face on the lower side the center region to be the dense part reaches a high temperature after the other parts reach the high temperature. Such a method for firing so that the center region reaches a high temperature after the other parts reaches the high temperature may be a method of firing while placing a setter so that the honeycomb formed body has a difference in temperature during the firing. A difference in temperature between the center region and the other parts at the inflow end face is not limited especially, and a difference in temperature of 15 to 100° C. may be given, for example. Thereby, a dense part can be formed so that the porosity at the center region at the inflow end face of the honeycomb structure to be obtained is lower than the porosity of the circumferential region.

After the firing step, the circumferential wall of the obtained honeycomb structure may be ground as needed, and then a circumference coating material may be applied to the circumference of the partition wall so as to have a circumference coating layer. For instance, the circumferential wall may be ground and the circumference coating layer may be formed by the following methods 1 to 3, whereby the honeycomb structure obtained can have the change ratio of average diameter that is 0.2 to 3%. In the method 1, the circumferential wall is ground so that the circumference wall has the same size from the inflow end face to the outflow end face, and the circumference coating material is applied so that the circumference coating layer becomes thicker from the inflow end face to the outflow end face. In the method 2, the circumferential wall is ground so that the circumference wall becomes smaller on the side of the inflow end face, and the circumference coating material is applied so that it has the same thickness from the inflow end face to the outflow end face. In the method 3, the circumferential wall is ground so that the circumference wall has the same size from the inflow end face to the outflow end face, and the circumference coating layer is applied so that the circumference coating material has the same thickness from the inflow end face to the outflow end face. In the method 3, drying is performed after the process, and grinding of the circumference coating layer is performed so that the diameter becomes smaller from the outflow end face to the inflow end face. For the method for manufacturing the honeycomb structure of the present invention, the methods 1 and 2 are preferable among these methods 1 to 3.

EXAMPLES

Example 1

To 100 parts by mass of the cordierite forming raw material, 0.5 part by mass of pore former, 33 parts by mass of dispersing medium, and 5.6 parts by mass of organic binder were added, followed by mixing and kneading to prepare a kneaded material. As the cordierite forming raw material, alumina, aluminum hydroxide, kaolin, talc, and silica were used. As the dispersing medium, water was used. As the pore former, water absorptive polymer of 10 to 50 μm in average particle diameter was used. As the organic binder, methylcellulose was used. As the dispersing agent, dextrin was used.

Next, the kneaded material was extruded using a predetermined die, so that a honeycomb formed body having the quadrangular cells and having a round pillar shape as the overall shape was obtained.

Next, the honeycomb formed body was placed on a firing setter made of alumina so that the inflow end face of the honeycomb structure to be formed faced downward. The honeycomb formed body was dried by a hot-air drier. The drying was performed under the condition of 95 to 145° C.

Next, the dried honeycomb formed body was fired by a tunnel kiln (continuous firing oven). The firing was performed under the conditions of 1350 to 1440° C. for 10 hours, so that a honeycomb fired body was obtained. In Example 1, temperature was raised during the firing so that the temperature of the center region at the inflow end face was delayed by 50° C. compared to the temperature of the other parts.

The honeycomb structure of Example 1 had a dense part at the inflow end face, and the dense part included a center region of the inflow end face and was a part from the center region of the inflow end face along the axial direction. The dense part was configured so that its porosity was lower than the porosity of the circumferential region on the outside of the center region. The obtained honeycomb structure had an outside-diameter increasing part 17 as in the honeycomb structure 100 of FIG. 2. The outside-diameter increasing part had an outside diameter of a plane orthogonal to the axial direction of the honeycomb structure body 4 that increased from the inflow end face 11 to the outflow end face 12.

The honeycomb structure of Example 1 had a thickness of the partition wall in the center region that was 50 μm and a thickness of the partition wall in the circumferential region that was 70 μm. The cell density was 93 cells/cm². The cells had a quadrangular shape. In the fields of "cell structure" of Table 1, the thickness of the partition wall in the center region, the thickness of the partition wall in the circumferential region, the cell density and the cell shape are shown. When the honeycomb structure manufactured did not have a plugging portion, this is shown as "no" in the field of "plugging portion" of Table 1. When the honeycomb structure manufactured had a plugging portion, this is shown as "yes" in the field of "plugging portion" of Table 1. Since the honeycomb structure of Example 1 did not have a plugging portion, "no" is written in the corresponding field of "plugging portion" of Table 1.

The honeycomb structure of Example 1 had a round shape in cross section orthogonal to the axial direction, and had the circumferential shape as shown in FIG. 2. The honeycomb structure had a diameter at the outflow end face that was 105.4 mm, and had a length (overall length) from the inflow end face to the outflow end face that was 81.2 mm. The shapes of the honeycomb structure of Example 1 are written in the fields of "cross-sectional shape", "circumferential shape" and "overall length" of Table 1. In the field of "forming method" of the "circumferential shape" of Table 1, "monolithic" is written when the honeycomb structure had a circumferential wall that was formed monolithically with the partition wall. When the honeycomb structure had a circumference coating layer formed by removing the circumferential wall monolithically formed with the partition wall by processing of the circumference and applying a circumference coating material so as to surround the partition wall, "circumference processing" is written in this field. In the field of "diameter" of Table 1, the value of "target diameter of the outflow end face" of the honeycomb structure is shown, and the actual diameter (Dx, Dy) of the manufactured honeycomb structure is shown in Table 3.

For the honeycomb structure of Example 1, the porosity was measured at the measurement points of P1 to P10 of FIG. 6. Table 2 shows the measurement result of the porosity. Based on the measurement result of porosity, "average of P1, P3 to P5" and "average of P6, P8 to P10" were obtained. Table 2 shows the result.

Based on the values of porosity at the measurement points of P1 to P10, the change ratio of porosity (%) at the inflow end face and at the outflow end face was calculated by the above Expression (1) or (3). Table 3 shows the result.

The average diameter Dx (mm) at the inflow end face of the honeycomb structure body and the average diameter Dy (mm) at the outflow end face of the honeycomb structure body were obtained. The average diameter Dx at the inflow end face was 103.2 mm, and the average diameter Dy at the outflow end face was 105.4 mm. Based on the values of the average diameter Dx and the average diameter Dy, the change ratio of average diameter was calculated by the above Expression (2). Table 3 shows the result.

TABLE 1

| | Cell structure | | | | |
|---|---|---|---|---|---|
| | Thickness of partition wall in center region (μm) | Thickness of partition wall in circumferential region (μm) | Cell density (cells/cm²) | Cell shape | Presence of plugging portion |
| Ex. 1 | 50 | 70 | 93 | quadrangle | no |
| Ex. 2 | 50 | 70 | 93 | quadrangle | no |
| Ex. 3 | 64 | 64 | 93 | quadrangle | no |
| Ex. 4 | 64 | 64 | 93 | quadrangle | no |
| Ex. 5 | 64 | 64 | 139.5 | quadrangle | no |
| Ex. 6 | 64 | 90 | 139.5 | quadrangle | no |
| Ex. 7 | 90 | 90 | 93 | quadrangle | no |
| Ex. 8 | 90 | 110 | 93 | quadrangle | no |
| Ex. 9 | 110 | 110 | 62 | quadrangle | no |
| Ex. 10 | 110 | 110 | 93 | quadrangle | no |
| Ex. 11 | 170 | 170 | 62 | quadrangle | no |
| Ex. 12 | 132 | 132 | 46.5 | quadrangle | no |
| Ex. 13 | 203 | 203 | 46.5 | quadrangle | no |
| Ex. 14 | 170 | 170 | 62 | quadrangle | no |
| Ex. 15 | 165 | 165 | 62 | quadrangle | no |
| Ex. 16 | 300 | 300 | 31 | quadrangle | no |
| Ex. 17 | 300 | 300 | 46.5 | quadrangle | no |

TABLE 1-continued

| | | | | | |
|---|---|---|---|---|---|
| Ex. 18 | 114 | 114 | 62 | quadrangle | no |
| Ex. 19 | 203 | 203 | 46.5 | quadrangle | no |
| Ex. 20 | 170 | 170 | 62 | quadrangle | no |
| Ex. 21 | 90 | 90 | 93 | quadrangle | yes |
| Ex. 22 | 230 | 230 | 37.2 | quadrangle | yes |
| Ex. 23 | 300 | 300 | 46.5 | quadrangle | yes |
| Ex. 24 | 155 | 155 | 34.1 | quadrangle | yes |
| Ex. 25 | 133 | 133 | 55.8 | quadrangle | yes |
| Ex. 26 | 254 | 254 | 46.5 | quadrangle | yes |

| | Cross-sectional shape | Circumferential shape | | Diameter (mm) | Long diameter (mm) | Short diameter (mm) | Overall length (mm) |
|---|---|---|---|---|---|---|---|
| | | Forming method | Reference drawing | | | | |
| Ex. 1 | circle | monolithic | FIG. 2 | 105.7 | — | — | 81.2 |
| Ex. 2 | circle | monolithic | FIG. 2 | 105.7 | — | — | 81.2 |
| Ex. 3 | circle | monolithic | FIG. 12 | 76.2 | — | — | 50.0 |
| Ex. 4 | circle | monolithic | FIG. 12 | 129.0 | — | — | 100.0 |
| Ex. 5 | circle | monolithic | FIG. 14 | 93.0 | — | — | 125.0 |
| Ex. 6 | circle | monolithic | FIG. 14 | 105.7 | — | — | 114.0 |
| Ex. 7 | circle | monolithic | FIG. 2 | 110.0 | — | — | 91.2 |
| Ex. 8 | circle | monolithic | FIG. 15 | 105.7 | — | — | 81.2 |
| Ex. 9 | circle | monolithic | FIG. 16 | 118.4 | — | — | 118.4 |
| Ex. 10 | circle | monolithic | FIG. 16 | 118.4 | — | — | 91.0 |
| Ex. 11 | circle | circumference processing | FIG. 13 | 190.5 | — | — | 114.3 |
| Ex. 12 | circle | circumference processing | FIG. 15 | 355.6 | — | — | 101.6 |
| Ex. 13 | circle | monolithic | FIG. 2 | 143.8 | — | — | 76.2 |
| Ex. 14 | ellipse | monolithic | FIG. 12 | — | 228.6 | 137.2 | 152.4 |
| Ex. 15 | ellipse | monolithic | FIG. 17 | — | 95.0 | 70.0 | 125.0 |
| Ex. 16 | trapezoid | monolithic | FIG. 14 | — | 122.0 | 104.0 | 100.0 |
| Ex. 17 | ellipse | monolithic | FIG. 12 | — | 169.7 | 80.8 | 150 |
| Ex. 18 | circle | circumference processing | FIG. 13 | 266.7 | — | — | 190.5 |
| Ex. 19 | circle | circumference processing | FIG. 15 | 228.6 | — | — | 152.4 |
| Ex. 20 | circle | circumference processing | FIG. 2 | 143.8 | — | — | 177.8 |
| Ex. 21 | circle | monolithic | FIG. 2 | 118.4 | — | — | 118.0 |
| Ex. 22 | circle | circumference processing | FIG. 12 | 105.7 | — | — | 100.0 |
| Ex. 23 | circle | monolithic | FIG. 2 | 129.0 | — | — | 152.4 |
| Ex. 24 | ellipse | monolithic | FIG. 12 | — | 230 | 96 | 152.4 |
| Ex. 25 | ellipse | circumference processing | FIG. 15 | — | 230 | 96 | 130.0 |
| Ex. 26 | circle | monolithic | FIG. 12 | 118.4 | — | — | 120.0 |

TABLE 2

| | Porosity(%) | | | | | | | | | | |
|---|---|---|---|---|---|---|---|---|---|---|---|
| | Inflow end face | | | | | | Outflow end face | | | | |
| | P1 | P2 | P3 | P4 | P5 | P1, P3 to P5 average | P6 | P7 | P8 | P9 | P10 | P6, P8 to P10 average |
| Ex. 1 | 26.4 | 25.1 | 26.7 | 26.8 | 26.9 | 26.7 | 26.7 | 26.4 | 26.3 | 26.5 | 26.5 | 26.5 |
| Ex. 2 | 35.7 | 33.8 | 35.2 | 35.9 | 35.8 | 35.7 | 35.2 | 35.7 | 35.8 | 35.5 | 35.6 | 35.5 |
| Ex. 3 | 26.3 | 24.7 | 26.0 | 26.4 | 26.4 | 26.3 | 27.0 | 26.6 | 26.9 | 27.2 | 26.9 | 27.0 |
| Ex. 4 | 34.0 | 33.0 | 34.2 | 34.0 | 34.4 | 34.2 | 34.5 | 34.8 | 34.4 | 34.8 | 34.8 | 34.6 |
| Ex. 5 | 26.8 | 24.8 | 26.3 | 26.9 | 27.0 | 26.8 | 26.9 | 26.9 | 26.8 | 26.9 | 27.0 | 26.9 |
| Ex. 6 | 34.1 | 33.0 | 33.9 | 34.0 | 34.2 | 34.1 | 34.2 | 34.3 | 34.1 | 34.1 | 34.4 | 34.2 |
| Ex. 7 | 33.9 | 32.0 | 33.7 | 34.1 | 33.9 | 33.9 | 33.8 | 33.7 | 33.6 | 33.6 | 33.7 | 33.7 |
| Ex. 8 | 54.0 | 52.5 | 54.1 | 54.2 | 54.0 | 54.1 | 54.0 | 54.3 | 54.2 | 54.2 | 54.1 | 54.1 |
| Ex. 9 | 34.5 | 33.4 | 34.8 | 34.9 | 34.9 | 34.8 | 34.6 | 34.8 | 34.6 | 34.7 | 34.8 | 34.7 |
| Ex. 10 | 35.2 | 33.8 | 35.1 | 35.0 | 35.3 | 35.2 | 34.5 | 34.8 | 34.5 | 34.7 | 34.6 | 34.7 |
| Ex. 11 | 33.0 | 32.4 | 33.2 | 33.1 | 33.3 | 33.2 | 33.5 | 33.6 | 33.2 | 33.4 | 33.4 | 33.4 |
| Ex. 12 | 34.9 | 34.0 | 34.7 | 34.9 | 34.9 | 34.9 | 34.8 | 34.7 | 34.9 | 34.9 | 34.8 | 34.9 |
| Ex. 13 | 36.6 | 34.6 | 36.3 | 36.5 | 36.9 | 36.6 | 36.4 | 36.2 | 36.1 | 36.5 | 36.6 | 36.4 |
| Ex. 14 | 35.2 | 33.9 | 35.0 | 35.2 | 35.2 | 35.2 | 35.3 | 35.2 | 35.7 | 35.4 | 35.4 | 35.5 |
| Ex. 15 | 35.1 | 33.5 | 34.8 | 35.1 | 35.3 | 35.1 | 35.0 | 34.6 | 34.7 | 34.8 | 34.8 | 34.8 |
| Ex. 16 | 34.8 | 33.1 | 34.7 | 34.7 | 34.9 | 34.8 | 34.6 | 34.9 | 35.0 | 34.7 | 34.8 | 34.8 |
| Ex. 17 | 36.1 | 34.6 | 36.2 | 36.3 | 36 | 36.2 | 35.9 | 35.8 | 36.0 | 35.8 | 35.7 | 35.9 |
| Ex. 18 | 33.8 | 33.2 | 34.0 | 34.2 | 34.1 | 34.0 | 34.1 | 34.5 | 34.2 | 34.3 | 34.4 | 34.3 |
| Ex. 19 | 50.1 | 48.0 | 49.5 | 49.8 | 48.5 | 49.5 | 49.8 | 49.8 | 49.5 | 50.2 | 50.3 | 50.0 |

TABLE 2-continued

| | Porosity(%) | | | | | | | | | | |
|---|---|---|---|---|---|---|---|---|---|---|---|
| | Inflow end face | | | | | | Outflow end face | | | | |
| | P1 | P2 | P3 | P4 | P5 | P1, P3 to P5 average | P6 | P7 | P8 | P9 | P10 | P6, P8 to P10 average |
| Ex. 20 | 35.5 | 33.8 | 34.8 | 35.3 | 35.6 | 35.3 | 34.8 | 35.0 | 35.2 | 35.3 | 35.4 | 35.2 |
| Ex. 21 | 63.1 | 61.0 | 63.2 | 62.8 | 63.1 | 63.1 | 63.1 | 63.0 | 63.4 | 62.9 | 63.3 | 63.2 |
| Ex. 22 | 64.0 | 62.7 | 64.1 | 64.2 | 64.3 | 64.2 | 63.9 | 64.0 | 64.1 | 64.4 | 63.9 | 64.1 |
| Ex. 23 | 61.1 | 58.0 | 61.3 | 61.5 | 61.4 | 61.3 | 61.4 | 61.3 | 61.2 | 61.4 | 61.3 | 61.3 |
| Ex. 24 | 48.1 | 46.3 | 48.3 | 48.1 | 47.9 | 48.1 | 48.2 | 48.3 | 48.3 | 48.2 | 48.1 | 48.2 |
| Ex. 25 | 48.4 | 45.0 | 48.5 | 48.8 | 48.6 | 48.6 | 48.5 | 48.6 | 48.7 | 48.4 | 48.6 | 48.6 |
| Ex. 26 | 62.2 | 60.0 | 62.4 | 62.3 | 62.5 | 62.4 | 62.2 | 62.0 | 62.4 | 62.5 | 62.6 | 62.4 |

TABLE 3

| | Change ratio of porosity at one end face (%) | | Average diameter (mm) | | |
|---|---|---|---|---|---|
| | Inflow end face | Outflow end face | Dx | Dy | Change ratio of average diameter (%) |
| Ex. 1 | 6.0 | 0.4 | 103.2 | 105.4 | 2.09 |
| Ex. 2 | 5.2 | −0.5 | 104.9 | 106.0 | 1.04 |
| Ex. 3 | 6.0 | 1.5 | 73.9 | 76.1 | 2.89 |
| Ex. 4 | 3.4 | −0.5 | 128.7 | 129.2 | 0.39 |
| Ex. 5 | 7.3 | 0.0 | 92.8 | 95.6 | 2.93 |
| Ex. 6 | 3.1 | 0.0 | 105.5 | 106.0 | 0.47 |
| Ex. 7 | 5.6 | −0.1 | 108.7 | 110.2 | 1.36 |
| Ex. 8 | 2.9 | −0.3 | 105.5 | 106.1 | 0.57 |
| Ex. 9 | 4.0 | −0.4 | 118.1 | 119.3 | 1.01 |
| Ex. 10 | 3.8 | 0.7 | 117.5 | 118.7 | 1.01 |
| Ex. 11 | 2.3 | −0.7 | 190.3 | 190.7 | 0.21 |
| Ex. 12 | 2.4 | 0.4 | 355.2 | 356.2 | 0.28 |
| Ex. 13 | 5.4 | 0.5 | 142.3 | 144.2 | 1.32 |
| Ex. 14 | 3.6 | 0.7 | 182.1 | 183.2 | 0.60 |
| Ex. 15 | 4.5 | 0.6 | 81.9 | 82.6 | 0.85 |
| Ex. 16 | 4.8 | −0.4 | 112.0 | 1114 | 1.23 |
| Ex. 17 | 4.3 | 0.1 | 124.6 | 125.6 | 0.80 |
| Ex. 18 | 2.4 | −0.7 | 265.1 | 266.5 | 0.53 |
| Ex. 19 | 3.0 | 0.3 | 227.8 | 228.7 | 0.39 |
| Ex. 20 | 4.2 | 0.5 | 143.3 | 143.9 | 0.42 |
| Ex. 21 | 3.3 | 0.3 | 118.0 | 118.5 | 0.42 |
| Ex. 22 | 2.3 | 0.1 | 105.8 | 106.1 | 0.28 |
| Ex. 23 | 5.4 | 0.0 | 126.0 | 129.0 | 2.33 |
| Ex. 24 | 3.7 | −0.2 | 162.4 | 163.1 | 0.43 |
| Ex. 25 | 7.4 | −0.1 | 160.0 | 163.0 | 1.84 |
| Ex. 26 | 3.8 | 0.7 | 118.0 | 118.5 | 0.42 |

Examples 2 to 26

Honeycomb structures of Examples 2 to 26 were manufactured by changing the cell structure, the cross-sectional shape, the circumferential shape and the like as in Table 1. The honeycomb structures of Examples 2 to 26 had the circumferential shapes corresponding to any one of the shapes in FIGS. 2, 12 to 17. The fields of "reference drawing" of the "circumferential shape" of Table 1 show to which one of the shapes of FIGS. 2, 12 to 17 the honeycomb structure of each Example corresponds. For instance, when FIG. 12 is written in the field of "reference drawing" of the "circumferential shape" of Table 1, the honeycomb structure has the circumferential shape corresponding to the shape of FIG. 12.

In Examples 11, 12, 18 to 20, 22, and 25, their circumference coating layers were formed by removing the circumferential wall monolithically formed with the partition wall by processing of the circumference and applying a circumference coating material so as to surround the partition wall. In Examples 11, 12, 18 to 20, 22 and 25, the circumferential wall was processed so that the side of the inflow end face is formed smaller, and the circumference coating material was applied so that it had a same thickness from the inflow end face to the outflow end face. In Examples 21 to 26, a plugging portion was disposed at the honeycomb structures so as to plug any one of the ends of the cells.

In Examples 2 to 26, the amount of pore former added to the kneaded material was adjusted appropriately, so as to control the porosity of the honeycomb structure to be formed. Temperature was raised during the firing so that the temperature of the center region at the inflow end face faced downward was delayed by 15 to 100° C. compared to the temperature of the other parts.

For the honeycomb structures of Examples 2 to 26, the porosity was measured at the measurement points of P1 to P10 of FIG. 6. Table 2 shows the measurement result of the porosity. Based on the measurement result of porosity, "average of P1, P3 to P5" and "average of P6, P8 to P10" were obtained. Table 2 shows the result.

Based on the values of porosity at the measurement points of P1 to P10, the change ratio of porosity (%) at the inflow end face and at the outflow end face of the honeycomb structures of Examples 2 to 26 was calculated by the above Expression (1) or (3). Table 3 shows the result.

The average diameter Dx (mm) at the inflow end face of the honeycomb structure body and the average diameter Dy (mm) at the outflow end face of the honeycomb structure body were measured, and the change ratio of average diameter was calculated by the above Expression (2). Table 3 shows the result.

For the honeycomb structures of Examples 1 to 26, their "erosion resistance" and "thermal shock resistance" were evaluated by the following methods. Table 4 shows the result. For the "erosion resistance" and "thermal shock resistance", evaluation was made by comparing the honeycomb structures of Examples 1 to 26 with the honeycomb structures of Comparative Examples having the same number among Comparative Examples 1 to 26 as described later.

[Erosion Resistance]

Gas and abrasive grains were supplied to a casing storing a honeycomb structure. Then erosion resistance of the honeycomb structure was evaluated using a "gas burner apparatus" enabling collision of the end faces of the honeycomb structure with the gas and abrasive grains. Specifically, the volume (cm$^3$) and mass (g) of the manufactured honeycomb structure were firstly measured, and its bulk density (g/cm$^3$) was calculated. Next, the honeycomb structure of each Example was stored (canning) in a casing, and the casing was set so that gas generated from the gas burner apparatus flowed to the end face of the honeycomb structure at 45°. Next, abrasive grains (silicon carbide "GC320 (product name)" having the average particle diameter of 50 μm) was supplied into the gas of 700° C. and 270 m/sec, and the abrasive grains were allowed to collide with the end face of the honeycomb structure so that the amount of collision of the abrasive grains was 15 g/200 sec. After collision with gas and abrasive grains, the honeycomb structure was taken out, and the mass (g) of the honeycomb structure was measured. Then, the amount (erosion amount) of the honeycomb structure ground by the test was calculated from a difference in mass of the honeycomb structure before and after the test. After that, erosion volume ($cm^3$) was calculated from the bulk density ($g/cm^3$) and the erosion amount (g). In this way, erosion resistance of the honeycomb structure was evaluated. The burner apparatus was of a type enabling to change the temperature of gas transiently by controlling the ratio of the combustion gas of the gas burner including propane as fuel to diluted air. In this evaluation, a honeycomb structure with less erosion volume has better erosion resistance. Erosion resistance was evaluated by comparing Examples and Comparative Examples having the same number, which were made of the same material and had the same porosity of the base and cell structure. Comparative Examples were evaluated with the following three stages of evaluation criteria from "A" to "C" with reference to Examples.

Evaluation Criteria of Erosion Resistance:

When the erosion amount of Comparative example increased by 50% or more with reference to Example having the same number, it was evaluated as "B". When it increased by 100% or more, such Comparative Example was evaluated as "C". In other words, when Comparative Example was evaluated as "B", the erosion amount of Example having the same number decreased by 33% or more. When Comparative Example was evaluated as "C", the erosion amount of Example having the same number decreased by 50% or more.

[Thermal Shock Resistance]

Figure 18:
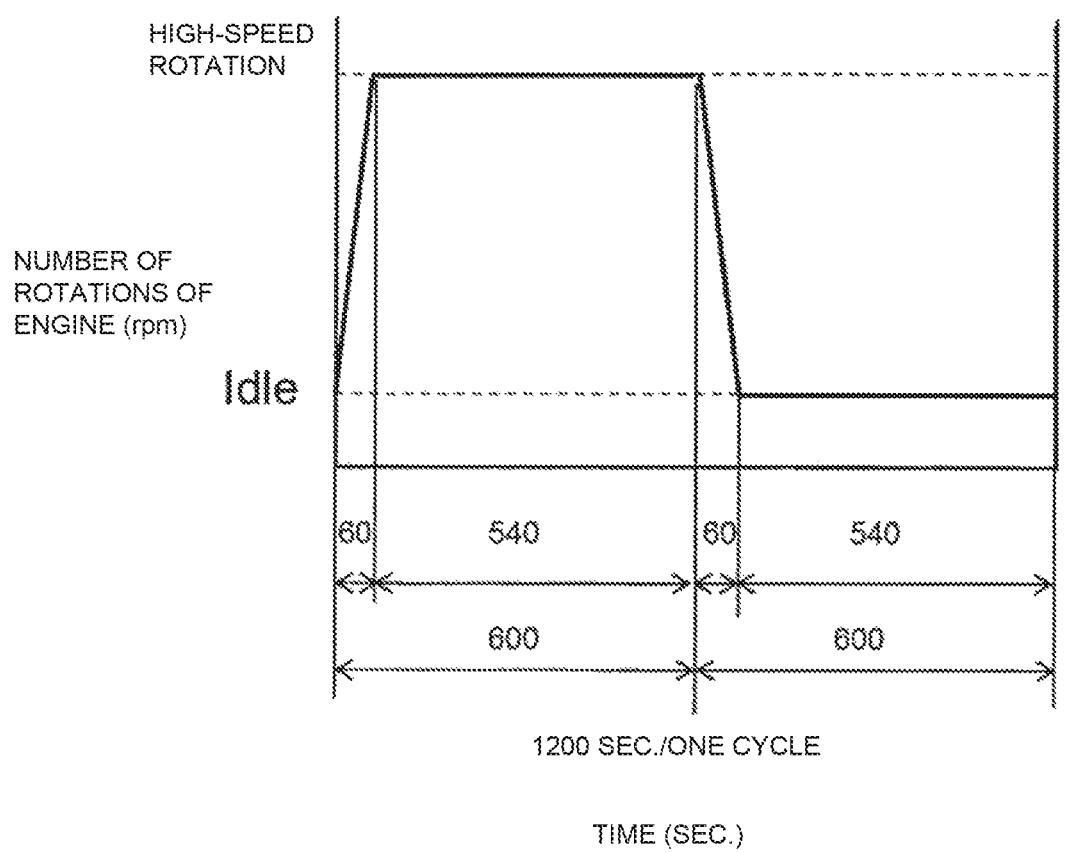
FIG. 18 is a graph showing the relationship between operating time (seconds) of the engine and the rotating speed of the engine (rpm) in the test on thermal shock resistance.

A metal can gripping and storing a honeycomb structure was connected to an exhaust port of a straight four-cylinder gasoline engine with the displacement of 2.0 litters. Thermal shock resistance was evaluated by loading a three-way catalyst at the honeycomb structures of Examples and Comparative Examples so that the loading amount was 150 g/L. Then, a sample including the honeycomb structure loaded with the three-way catalyst as the carrier was connected immediately below the engine. Next, as shown in FIG. 18, the engine was operated under the condition of repeating the high-speed rotation of the engine and idling. At this time, in each Example, the temperature was adjusted so that the temperature of the carrier at the center part at the position of 5 mm from the inlet side of the honeycomb structure had the highest temperature of 1050° C. and the lowest temperature of 100° C. or lower. The highest temperature was adjusted by controlling the high-speed rotation of the engine, and the lowest temperature was adjusted by introducing air during cooling. Such operation of the engine in 20 minutes was 1 cycle, and 300 cycles was repeated. In this way, the test of thermal shock resistance was conducted. For Comparative Examples, test was conducted under the conditions of the number of rotations of the engine and the amount of air introduced during cooling as those of Example having the same number. After the test, the metal can was removed from the gasoline engine, and then the carrier was removed from the metal can. Then, the presence or absence of cracks was observed visually at the inflow end face and at the outflow end face of the honeycomb structure. Table 4 shows the result of observation at the inflow end face and the result of observation at the outflow end face. FIG. 18 is a graph showing the relationship between operating time (seconds) of the engine and the rotating speed of the engine (rpm) in the test on thermal shock resistance.

Evaluation Criteria of Thermal Shock Resistance:

When no cracks were observed, the honeycomb structure was evaluated as pass, and "OK" is written in Table 4.

When cracks were observed, the honeycomb structure was evaluated as fail, and "NG" is written in Table 4.

[General Evaluation]

General evaluation on thermal shock resistance was made based on the following evaluation criteria. Table 4 shows the result.

When both of the inflow end face and the outflow end face was "OK" for the evaluation of thermal shock resistance, the honeycomb structure was evaluated as "A".

When at least one of the inflow end face and the outflow end face was "NG" for the evaluation of thermal shock resistance, the honeycomb structure was evaluated as "C".

TABLE 4

|  | Erosion resistance | Thermal shock resistance | | |
| --- | --- | --- | --- | --- |
|  |  | Inflow end face | Outflow end face | General |
| Ex. 1 | A | OK | OK | A |
| Ex. 2 | A | OK | OK | A |
| Ex. 3 | A | OK | OK | A |
| Ex. 4 | A | OK | OK | A |
| Ex. 5 | A | OK | OK | A |
| Ex. 6 | A | OK | OK | A |
| Ex. 7 | A | OK | OK | A |
| Ex. 8 | A | OK | OK | A |
| Ex. 9 | A | OK | OK | A |
| Ex. 10 | A | OK | OK | A |
| Ex. 11 | A | OK | OK | A |
| Ex. 12 | A | OK | OK | A |
| Ex. 13 | A | OK | OK | A |
| Ex. 14 | A | OK | OK | A |
| Ex. 15 | A | OK | OK | A |
| Ex. 16 | A | OK | OK | A |
| Ex. 17 | A | OK | OK | A |
| Ex. 18 | A | OK | OK | A |
| Ex. 19 | A | OK | OK | A |
| Ex. 20 | A | OK | OK | A |
| Ex. 21 | A | OK | OK | A |
| Ex. 22 | A | OK | OK | A |
| Ex. 23 | A | OK | OK | A |
| Ex. 24 | A | OK | OK | A |
| Ex. 25 | A | OK | OK | A |
| Ex. 26 | A | OK | OK | A |

Comparative Examples 1 to 26

Honeycomb structures of Comparative Examples 1 to 26 were manufactured by changing the cell structure, the cross-sectional shape, the circumferential shape and the like as in Table 5. The honeycomb structures of Comparative Examples 1 to 26 had the circumferential shapes corresponding to any one of the shapes in FIGS. 2, 12 to 17 or had the circumferential shape as described below. The honeycomb structures of Comparative Examples 5, 10, 11 and 24 did not have an outside-diameter increasing part, and their outside diameter of a plane orthogonal to the axial direction was constant from the inflow end face to the outflow end face. For the honeycomb structures of such a shape, "rectangle" is written in the fields of "reference drawing" of the "circumferential shape" of Table 5. The honeycomb structure of Comparative Example 20 had a circumferential shape such that the inflow end face and the outflow end face of the shape of FIG. 2 were reversely arranged. For the honeycomb structure of such a shape, "FIG. 2 (reversed)" is written in the field of "reference drawing" of the "circumferential shape" of Table 5.

In Comparative Examples 11, 12, 18 to 20, 22, and 25, their circumference coating layers were formed by removing the circumferential wall monolithically formed with the partition wall by processing of the circumference and applying a circumference coating material so as to surround the partition wall. In Comparative Examples 21 to 26, a plugging portion was disposed at the honeycomb structures so as to plug any one of the ends of the cells.

For the honeycomb structures of Comparative Examples 1 to 26, the porosity was measured at the measurement points of P1 to P10 of FIG. 6. Table 6 shows the measurement result of the porosity. Based on the measurement result of porosity, "average of P1, P3 to P5" and "average of P6, P8 to P10" were obtained. Table 6 shows the result.

Based on the values of porosity at the measurement points of P1 to P10, the change ratio of porosity (%) at the inflow end face and at the outflow end face of the honeycomb structures of Comparative Examples 1 to 26 was calculated by the above Expression (1) or (3). Table 7 shows the result.

The average diameter Dx (mm) at the inflow end face of the honeycomb structure body and the average diameter Dy (mm) at the outflow end face of the honeycomb structure body were obtained, and the change ratio of average diameter was calculated by the above Expression (2). Table 7 shows the result.

For the honeycomb structures of Comparative Examples 1 to 26, their "erosion resistance" and "thermal shock resistance" were evaluated by the method similar to Example 1. Table 8 shows the result.

TABLE 5

| | Cell structure | | | | | |
|---|---|---|---|---|---|---|
| | Thickness of partition wall in center region (μm) | Thickness of partition wall in circumferential region (μm) | Cell density (cells/cm$^2$) | Cell shape | Plugging portion | Cross-sectional shape |
| Comp. Ex. 1 | 50 | 70 | 93 | quadrangle | no | circle |
| Comp. Ex. 2 | 50 | 70 | 93 | quadrangle | no | circle |
| Comp. Ex. 3 | 64 | 64 | 93 | quadrangle | no | circle |
| Comp. Ex. 4 | 64 | 64 | 93 | quadrangle | no | circle |
| Comp. Ex. 5 | 64 | 64 | 139.5 | quadrangle | no | circle |
| Comp. Ex. 6 | 64 | 90 | 139.5 | quadrangle | no | circle |
| Comp. Ex. 7 | 90 | 90 | 93 | quadrangle | no | circle |
| Comp. Ex. 8 | 90 | 110 | 93 | quadrangle | no | circle |
| Comp. Ex. 9 | 110 | 110 | 62 | quadrangle | no | circle |
| Comp. Ex. 10 | 110 | 110 | 93 | quadrangle | no | circle |
| Comp. Ex. 11 | 170 | 170 | 62 | quadrangle | no | circle |
| Comp. Ex. 12 | 132 | 132 | 46.5 | quadrangle | no | circle |
| Comp. Ex. 13 | 203 | 203 | 46.5 | quadrangle | no | circle |
| Comp. Ex. 14 | 170 | 170 | 62 | quadrangle | no | ellipse |
| Comp. Ex. 15 | 165 | 165 | 62 | quadrangle | no | ellipse |
| Comp. Ex. 16 | 300 | 300 | 31 | quadrangle | no | trapezoid |
| Comp. Ex. 17 | 300 | 300 | 46.5 | quadrangle | no | ellipse |
| Comp. Ex. 18 | 114 | 114 | 62 | quadrangle | no | circle |
| Comp. Ex. 19 | 203 | 203 | 46.5 | quadrangle | no | circle |
| Comp. Ex. 20 | 170 | 170 | 62 | quadrangle | no | circle |
| Comp. Ex. 21 | 90 | 90 | 93 | quadrangle | yes | circle |
| Comp. Ex. 22 | 230 | 230 | 37.2 | quadrangle | yes | circle |
| Comp. Ex. 23 | 300 | 300 | 46.5 | quadrangle | yes | circle |
| Comp. Ex. 24 | 155 | 155 | 34.1 | quadrangle | yes | ellipse |
| Comp. Ex. 25 | 133 | 133 | 55.8 | quadrangle | yes | ellipse |
| Comp. Ex. 26 | 254 | 254 | 46.5 | quadrangle | yes | circle |

| | Circumferential shape | | | Short | | |
|---|---|---|---|---|---|---|
| | Forming method | Reference drawing | Diameter (mm) | Long diameter (mm) | diameter (mm) | Overall length (mm) |
| Comp. Ex. 1 | monolithic | FIG. 2 | 105.7 | — | — | 81.2 |
| Comp. Ex. 2 | monolithic | FIG. 2 | 105.7 | — | — | 81.2 |
| Comp. Ex. 3 | monolithic | FIG. 12 | 76.2 | — | — | 50.0 |
| Comp. Ex. 4 | monolithic | FIG. 12 | 129.0 | — | — | 100.0 |
| Comp. Ex. 5 | monolithic | rectangle | 93.0 | — | — | 125.0 |
| Comp. Ex. 6 | monolithic | FIG. 14 | 105.7 | — | — | 114.0 |
| Comp. Ex. 7 | monolithic | FIG. 2 | 110.0 | — | — | 91.2 |
| Comp. Ex. 8 | monolithic | FIG. 15 | 105.7 | — | — | 81.2 |
| Comp. Ex. 9 | monolithic | FIG. 16 | 118.4 | — | — | 118.4 |
| Comp. Ex. 10 | monolithic | rectangle | 118.4 | — | — | 91.0 |
| Comp. Ex. 11 | circumference processing | rectangle | 190.5 | — | — | 114.3 |
| Comp. Ex. 12 | circumference processing | FIG. 15 | 355.6 | — | — | 101.6 |
| Comp. Ex. 13 | monolithic | FIG. 2 | 143.8 | — | — | 76.2 |
| Comp. Ex. 14 | monolithic | FIG. 12 | — | 228.6 | 137.2 | 152.4 |
| Comp. Ex. 15 | monolithic | FIG. 17 | — | 95.0 | 70.0 | 125.0 |
| Comp. Ex. 16 | monolithic | FIG. 14 | — | 122.0 | 104.0 | 100.0 |
| Comp. Ex. 17 | monolithic | FIG. 12 | — | 169.7 | 80.8 | 150 |

TABLE 5-continued

| | | | | | |
|---|---|---|---|---|---|
| Comp. Ex. 18 | circumference processing | FIG. 13 | 266.7 | — | — | 190.5 |
| Comp. Ex. 19 | circumference processing | FIG. 15 | 228.6 | — | — | 152.4 |
| Comp. Ex. 20 | circumference processing | FIG. 2 (reversed) | 143.8 | — | — | 177.8 |
| Comp. Ex. 21 | monolithic | FIG. 2 | 118.4 | — | — | 118.0 |
| Comp. Ex. 22 | circumference processing | FIG. 12 | 105.7 | — | — | 100.0 |
| Comp. Ex. 23 | monolithic | FIG. 2 | 129.0 | — | — | 152.4 |
| Comp. Ex. 24 | monolithic | rectangle | — | 230 | 96 | 152.4 |
| Comp. Ex. 25 | circumference processing | FIG. 15 | — | 230 | 96 | 130.0 |
| Comp. Ex. 26 | monolithic | FIG. 12 | 118.4 | — | — | 120.0 |

TABLE 6

| | Porosity(%) | | | | | | | | | | |
|---|---|---|---|---|---|---|---|---|---|---|---|
| | Inflow end face | | | | | | Outflow end face | | | | |
| | P1 | P2 | P3 | P4 | P5 | P1, P3 to P5 average | P6 | P7 | P8 | P9 | P10 | P6, P8 to P10 average |
| Comp. Ex. 1 | 27.0 | 27.2 | 27.1 | 27.1 | 27.2 | 27.1 | 26.9 | 26.8 | 27.1 | 27.1 | 27.2 | 27.1 |
| Comp. Ex. 2 | 35.5 | 34.9 | 35.4 | 35.4 | 35.6 | 35.5 | 35.6 | 35.4 | 35.4 | 35.6 | 35.5 | 35.5 |
| Comp. Ex. 3 | 26.3 | 23.8 | 26.1 | 26.2 | 26.4 | 26.3 | 26.3 | 26.2 | 26.4 | 26.4 | 26.3 | 26.4 |
| Comp. Ex. 4 | 34.7 | 34.2 | 34.8 | 34.9 | 34.8 | 34.8 | 34.5 | 34.3 | 34.3 | 34.3 | 34.2 | 34.3 |
| Comp. Ex. 5 | 26.8 | 26.7 | 26.5 | 26.6 | 26.7 | 26.7 | 26.9 | 26.8 | 26.6 | 26.6 | 26.5 | 26.7 |
| Comp. Ex. 6 | 34.5 | 31.0 | 34.3 | 34.5 | 34.4 | 34.4 | 33.9 | 33.6 | 34.0 | 33.8 | 33.7 | 33.9 |
| Comp. Ex. 7 | 33.8 | 33.2 | 33.7 | 33.6 | 33.8 | 33.7 | 33.9 | 34.0 | 33.8 | 33.9 | 34.0 | 33.9 |
| Comp. Ex. 8 | 54.1 | 49.2 | 53.9 | 53.9 | 54.0 | 54.0 | 54.2 | 54.1 | 54.1 | 54.1 | 54.0 | 54.1 |
| Comp. Ex. 9 | 34.5 | 34.7 | 34.4 | 34.5 | 34.6 | 34.5 | 34.6 | 34.5 | 34.4 | 34.4 | 34.6 | 34.5 |
| Comp. Ex. 10 | 35.1 | 35.3 | 35.4 | 35.4 | 35.2 | 35.3 | 35.0 | 35.3 | 35.1 | 35.2 | 35.1 | 35.1 |
| Comp. Ex. 11 | 33.3 | 32.1 | 33.5 | 33.5 | 33.4 | 33.4 | 33.5 | 33.4 | 33.2 | 33.4 | 33.3 | 33.4 |
| Comp. Ex. 12 | 34.8 | 34.5 | 34.6 | 34.7 | 34.5 | 34.7 | 34.7 | 34.8 | 34.3 | 34.7 | 34.8 | 34.8 |
| Comp. Ex. 13 | 36.2 | 33.0 | 36.4 | 36.3 | 36.3 | 36.3 | 36.5 | 36.3 | 36.2 | 36.3 | 36.4 | 36.4 |
| Comp. Ex. 14 | 35.3 | 34.8 | 35.1 | 35.2 | 35.0 | 35.2 | 35.4 | 35.3 | 35.6 | 35.4 | 35.6 | 35.5 |
| Comp. Ex. 15 | 35.1 | 35.2 | 35.4 | 35.2 | 35.1 | 35.2 | 35.1 | 35.3 | 35.2 | 35.1 | 35.2 | 35.2 |
| Comp. Ex. 16 | 34.8 | 34.3 | 34.6 | 34.6 | 34.5 | 34.6 | 34.8 | 34.5 | 34.6 | 34.7 | 34.6 | 34.7 |
| Comp. Ex. 17 | 36.3 | 32.8 | 35.9 | 36.0 | 36.1 | 36.1 | 36.1 | 36.0 | 36.3 | 36.2 | 36.2 | 36.2 |
| Comp. Ex. 18 | 33.9 | 30.5 | 34.3 | 34.1 | 34.1 | 34.1 | 34.1 | 34.0 | 34.3 | 34.1 | 34.2 | 34.2 |
| Comp. Ex. 19 | 49.9 | 48.8 | 49.8 | 49.9 | 48.8 | 49.6 | 49.8 | 49.8 | 49.5 | 50.2 | 50.3 | 50.0 |
| Comp. Ex. 20 | 35.3 | 34.0 | 34.9 | 35.2 | 35.5 | 35.2 | 34.8 | 35.0 | 35.2 | 35.3 | 35.4 | 35.2 |
| Comp. Ex. 21 | 63.1 | 63.0 | 63.1 | 62.9 | 63.2 | 63.1 | 63.2 | 63.0 | 63.2 | 62.8 | 63.4 | 63.2 |
| Comp. Ex. 22 | 64.0 | 62.8 | 64.2 | 64.3 | 64.2 | 64.2 | 63.8 | 64.0 | 64.2 | 64.2 | 64.0 | 64.1 |
| Comp. Ex. 23 | 61.2 | 55.0 | 61.2 | 61.3 | 61.5 | 61.3 | 61.2 | 61.2 | 61.3 | 61.6 | 61.5 | 61.4 |
| Comp. Ex. 24 | 48.2 | 47.9 | 48.2 | 48.2 | 48.0 | 48.2 | 48.1 | 48.2 | 48.2 | 48.3 | 48.2 | 48.2 |
| Comp. Ex. 25 | 48.5 | 45.8 | 48.3 | 48.6 | 48.7 | 48.5 | 48.4 | 48.6 | 48.6 | 48.5 | 48.6 | 48.5 |
| Comp. Ex. 26 | 62.3 | 62.3 | 62.6 | 62.5 | 62.6 | 62.5 | 62.1 | 62.0 | 62.3 | 62.5 | 62.5 | 62.4 |

TABLE 7

| | Change ratio of porosity at one end face (%) | | Average diameter (mm) | | |
|---|---|---|---|---|---|
| | Inflow end face | Outflow end face | Dx | Dy | Change ratio of average diameter (%) |
| Comp. Ex. 1 | −0.4 | 0.7 | 105.6 | 105.7 | 0.09 |
| Comp. Ex. 2 | 1.6 | 0.6 | 105.6 | 105.8 | 0.19 |
| Comp. Ex. 3 | 9.3 | 0.8 | 73.5 | 76.8 | 4.30 |
| Comp. Ex. 4 | 1.7 | 0.9 | 129.2 | 129.4 | 0.15 |
| Comp. Ex. 5 | −0.2 | 1.1 | 92.8 | 92.8 | 0.00 |
| Comp. Ex. 6 | 9.9 | 0.9 | 102.5 | 106.2 | 3.48 |
| Comp. Ex. 7 | 1.6 | 0.6 | 110.0 | 110.2 | 0.18 |
| Comp. Ex. 8 | 8.8 | 0.4 | 101.9 | 105.9 | 3.78 |
| Comp. Ex. 9 | −0.6 | 0.6 | 118.4 | 118.5 | 0.08 |
| Comp. Ex. 10 | −0.1 | 0.8 | 118.4 | 118.4 | 0.00 |
| Comp. Ex. 11 | 4.0 | 0.9 | 190.3 | 190.3 | 0.00 |
| Comp. Ex. 12 | 0.4 | 0.6 | 353.5 | 355.6 | 0.59 |
| Comp. Ex. 13 | 9.1 | 0.8 | 138.9 | 144.2 | 3.68 |
| Comp. Ex. 14 | 1.0 | 0.8 | 183.0 | 183.2 | 0.11 |
| Comp. Ex. 15 | 0.0 | 0.6 | 82.6 | 82.7 | 0.12 |
| Comp. Ex. 16 | 0.9 | 0.9 | 112.8 | 113.0 | 0.18 |
| Comp. Ex. 17 | 9.1 | 0.8 | 121.0 | 125.5 | 3.59 |
| Comp. Ex. 18 | 10.6 | 0.6 | 142.5 | 143.6 | 0.77 |
| Comp. Ex. 19 | 1.6 | 0.3 | 220.0 | 228.6 | 3.76 |
| Comp. Ex. 20 | 3.5 | 0.5 | 145.0 | 143.8 | −0.83 |
| Comp. Ex. 21 | 0.1 | 0.2 | 118.4 | 118.5 | 0.08 |
| Comp. Ex. 22 | 2.1 | 0.1 | 102.0 | 105.8 | 3.59 |
| Comp. Ex. 23 | 10.3 | 0.3 | 123.0 | 129.0 | 4.65 |
| Comp. Ex. 24 | 0.5 | 0.0 | 163.1 | 163.1 | 0.00 |
| Comp. Ex. 25 | 5.6 | −0.2 | 162.8 | 163.0 | 0.12 |
| Comp. Ex. 26 | 0.3 | 0.6 | 118.3 | 118.5 | 0.17 |

TABLE 8

| | Erosion resistance | Thermal shock resistance | | |
|---|---|---|---|---|
| | | Inflow end face | Outflow end face | General |
| Comp. Ex. 1 | C | NG | NG | C |
| Comp. Ex. 2 | C | NG | NG | C |
| Comp. Ex. 3 | A | NG | NG | C |
| Comp. Ex. 4 | B | NG | NG | C |
| Comp. Ex. 5 | C | NG | NG | C |
| Comp. Ex. 6 | A | NG | NG | C |
| Comp. Ex. 7 | C | NG | NG | C |
| Comp. Ex. 8 | A | NG | NG | C |
| Comp. Ex. 9 | B | NG | NG | C |
| Comp. Ex. 10 | C | NG | NG | C |
| Comp. Ex. 11 | A | OK | NG | C |
| Comp. Ex. 12 | B | NG | OK | C |
| Comp. Ex. 13 | A | NG | NG | C |
| Comp. Ex. 14 | B | NG | NG | C |
| Comp. Ex. 15 | C | NG | NG | C |
| Comp. Ex. 16 | B | NG | NG | C |
| Comp. Ex. 17 | A | NG | NG | C |
| Comp. Ex. 18 | A | OK | NG | C |
| Comp. Ex. 19 | B | NG | OK | C |
| Comp. Ex. 20 | A | OK | NG | C |
| Comp. Ex. 21 | B | NG | NG | C |
| Comp. Ex. 22 | A | NG | OK | C |
| Comp. Ex. 23 | A | NG | NG | C |
| Comp. Ex. 24 | B | NG | NG | C |
| Comp. Ex. 25 | A | OK | NG | C |
| Comp. Ex. 26 | B | NG | NG | C |

(Results)

As shown in Table 4, all of the honeycomb structures of Examples 1 to 26 had favorable results for the evaluations of "erosion resistance" and "thermal shock resistance". The honeycomb structures of Comparative Examples 1 to 26 generated cracks at least at one of the inflow end face and the outflow end face of the honeycomb structures. For instance, the honeycomb structures of Comparative Examples 3, 6, 8, 11, 13, 17 and 18 showed positive values of the change ratio of porosity (%) at the inflow end face, and had favorable results on erosion resistance. They, however, failed to suppress cracks.

The honeycomb structure of the present invention can be used as a catalyst carrier to load a catalyst to purify exhaust gas emitted from a gasoline engine, a diesel engine or the like or as a filter to trap soot in exhaust gas emitted from a gasoline engine

DESCRIPTION OF REFERENCE NUMERALS

1: partition wall, 2: cell, 2a: inflow cell, 2b: outflow cell, 3: circumferential wall, 4: honeycomb structure body, 5: plugging portion, 11: inflow end face, 12: outflow end face, 15: dense part, 17: outside-diameter increasing part, 100, 200, 300, 400, 500, 600, 700, 800: honeycomb structure, P1, P3 to P5: circumferential region (circumferential region of inflow end face), P2: center region (center region of inflow end face), P6, P8 to P10: circumferential region (circumferential region of outflow end face), P7: center region (center region of outflow end face), Dx: average diameter of inflow end face, Dy: average diameter of outflow end face

What is claimed is:

1. A honeycomb structure, comprising a honeycomb structure body having an inflow end face and an outflow end face, the honeycomb structure body including: a porous partition wall defining a plurality of cells extending from the inflow end face to the outflow end face and serving as a through channel of fluid; and a circumferential wall disposed to surround the partition wall, wherein the honeycomb structure body has a dense part, the dense part including a center region of the inflow end face and being a part from the center region of the inflow end face along an axial direction of the honeycomb structure body, and the dense part having a change ratio of porosity of 2 to 8%, the change ratio of porosity being calculated by the following Expression (1), and the honeycomb structure body has an outside-diameter increasing part at least at a part of the honeycomb structure body in the axial direction, the outside-diameter increasing part having an outside diameter of a plane orthogonal to the axial direction of the honeycomb structure body that increases from the inflow end face to the outflow end face, and the honeycomb structure body has a change ratio of average diameter that is 0.2 to 3%, the change ratio of average diameter being calculated by the following Expression (2), $$(1-Px/Py) \times 100, \qquad \text{Expression (1):}$$

where in Expression (1), Px denotes porosity (%) at the center region of the inflow end face, and Py denotes porosity (%) of a circumferential region of the inflow end face other than the center region, $$(1-Dx/Dy) \times 100, \qquad \text{Expression (2):}$$

where in Expression (2), Dx denotes an average diameter (mm) of the inflow end face of the honeycomb structure body, and Dy denotes an average diameter (mm) of the outflow end face of the honeycomb structure body.

2. The honeycomb structure according to claim 1, wherein the center region of the inflow end face has a change ratio of porosity calculated by the above Expression (1) that is 2 to 6%.

3. The honeycomb structure according to claim 1, wherein a center region of the outflow end face of the honeycomb structure body has a change ratio of porosity calculated by the following Expression (3) that is less than 2%, $$(1-P'x/P'y) \times 100, \qquad \text{Expression (3):}$$

where in Expression (3), P'x denotes porosity (%) at the center region of the outflow end face, and P'y denotes porosity (%) of a circumferential region of the outflow end face other than the center region.

4. The honeycomb structure according to claim 1, wherein the dense part has porosity of 20 to 70%.

5. The honeycomb structure according to claim 1, wherein the outside-diameter increasing part is present across an overall region of the honeycomb structure body in the axial direction.

6. The honeycomb structure according to claim 1, wherein the outside-diameter increasing part is present at only a part of the honeycomb structure body in the axial direction.

7. The honeycomb structure according to claim 1, wherein the circumferential wall of the honeycomb structure body includes a circumference coating layer disposed at circumference of the partition wall.

8. The honeycomb structure according to claim 1, further comprising a plugging portion disposed to plug any one of the ends of the cells in the honeycomb structure body.

* * * * *